(12) United States Patent
Khawaja et al.

(10) Patent No.: US 12,550,904 B2
(45) Date of Patent: *Feb. 17, 2026

(54) SYSTEMS AND METHODS FOR AUTOMATED FISH PROCESSING

(71) Applicant: Shinkei Systems Corp., Hackensack, NJ (US)

(72) Inventors: Saif Najam Khawaja, Hackensack, NJ (US); Zhifei Shen, Hackensack, NJ (US)

(73) Assignee: Shinkei Systems Corp., El Segundo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/916,324

(22) Filed: Oct. 15, 2024

(65) Prior Publication Data

US 2025/0040557 A1  Feb. 6, 2025

Related U.S. Application Data

(63) Continuation of application No. 18/582,481, filed on Feb. 20, 2024, now Pat. No. 12,161,126.

(60) Provisional application No. 63/446,699, filed on Feb. 17, 2023.

(51) Int. Cl.
A22B 3/00 (2006.01)
A22B 3/08 (2006.01)
A22B 5/00 (2006.01)

(52) U.S. Cl.
CPC ............. *A22B 3/083* (2013.01); *A22B 5/007* (2013.01)

(58) Field of Classification Search
CPC .................... A22B 3/083; A22B 5/007
USPC .......................................... 452/54
See application file for complete search history.

(56) References Cited

U.S. PATENT DOCUMENTS

| 4,557,019 A | 12/1985 | Van et al. |
| 4,748,724 A | 6/1988 | Lapeyre et al. |
| 6,014,936 A * | 1/2000 | Rogers ............... E04H 3/28 108/167 |
| 6,563,904 B2 | 5/2003 | Wijts et al. |
| 6,808,448 B1 | 10/2004 | Kanaya et al. |

(Continued)

FOREIGN PATENT DOCUMENTS

| CA | 2531981 A1 | 7/2006 |
| EP | 3490383 B1 | 5/2021 |

(Continued)

OTHER PUBLICATIONS

"2021 Pennovation Accelerator Names Two Winners: REGO and Shinkei Systems", Pennovation Works, 2021, downloaded Jan. 4, 2023, https://pennovation.upenn.edu/news/2021-pennovation-accelerator-names-two-winners-rego-and-shinkei-systems.

(Continued)

*Primary Examiner* — Richard T Price, Jr.
(74) *Attorney, Agent, or Firm* — Jeffrey Schox; Diana Lin

(57) ABSTRACT

A method for processing a live fish can include: determining a set of fish attributes of a fish, optionally sorting the fish based on the set of fish attributes, euthanizing the fish, exsanguinating the fish, and/or any other suitable steps. In variants, the method can additionally or alternatively include: discarding the fish after sorting, further processing the fish, and/or tracking the fish. However, the method can additionally and/or alternatively include any other suitable elements.

20 Claims, 17 Drawing Sheets

(56) References Cited

U.S. PATENT DOCUMENTS

| | | | |
|---|---|---|---|
| 7,452,266 B2 | 11/2008 | Bottemiller | |
| 7,623,249 B2 | 11/2009 | Sandberg et al. | |
| 8,092,283 B2 * | 1/2012 | Hansen | A22C 25/142 |
| | | | 452/121 |
| 9,095,147 B2 | 8/2015 | Hjalmarsson et al. | |
| 10,531,668 B2 * | 1/2020 | Steffens | A22C 25/08 |
| 11,498,235 B2 | 11/2022 | Blaine et al. | |
| 2004/0072525 A1 | 4/2004 | Pein | |
| 2007/0292559 A1 | 12/2007 | Garwood | |
| 2011/0207388 A1 | 8/2011 | Hansen | |
| 2019/0037865 A1 | 2/2019 | Pettersen et al. | |
| 2020/0288731 A1 | 9/2020 | Hjalmarsson et al. | |
| 2021/0142052 A1 | 5/2021 | James et al. | |
| 2023/0157263 A1 | 5/2023 | Brenner et al. | |
| 2024/0298656 A1 | 9/2024 | Stephens et al. | |

FOREIGN PATENT DOCUMENTS

| | | | |
|---|---|---|---|
| JP | 2000228941 A | 8/2000 | |
| WO | 9844805 A1 | 10/1998 | |
| WO | 0132025 A1 | 5/2001 | |
| WO | 2022083848 A1 | 4/2022 | |

OTHER PUBLICATIONS

"Shinkei Systems Fish processing robotics to quadruple fisher and farmer revenues", downloaded Jan. 4, 2023, https://www.ycombinator.com/companies/shinkei-systems.

"Stun & Bleed System, Fish processing in the most efficient and humane way possible", Optimar, https://optimar.no/stun-bleed-system, first downloaded Jan. 24, 2024.

Bjarnason, Jón Bjarni, "Computer vision system to detect salmon deformity", Final Report in Electrical Engineering B.Sc., 2016, School of Science and Engineering, Reykjavik University.

Coldewey, Devin , et al., "Shinkei Systems' AI-guided fish harvesting is more humane and less wasteful", TechCrunch, Jul. 28, 2022, https://techcrunch.com/2022/07/28/shinkei-systems-ai-guided-fish-harvesting-is-more-humane-and-less-wasteful/?guccounter=1.

Khawaja, Saif Najam, et al., "Systems and Methods for Automated Fish Processing", U.S. Appl. No. 18/582,481, filed Feb. 20, 2024.

Khawaja, Saif Najam, et al., "Systems and Methods of Fish Processing Device", U.S. Appl. No. 17/984,084, filed Nov. 9, 2023.

Khawaja, Saif Najam, et al., "Systems for Automated Fish Processing", U.S. Appl. No. 18/966,931, filed Dec. 3, 2024.

Stephens, Joseph , et al., "Systems for Automated Fish Processing", U.S. Appl. No. 18/601,788, filed Mar. 11, 2024.

\* cited by examiner

SYSTEMS AND METHODS FOR AUTOMATED FISH PROCESSING

CROSS-REFERENCE TO RELATED APPLICATIONS

This application is a continuation of U.S. application Ser. No. 18/582,481, filed 20 Feb. 2024, which claims the benefit of U.S. Provisional Application No. 63/446,699, filed 17 Feb. 2023, each of which is incorporated in its entirety by this reference.

TECHNICAL FIELD

This invention relates generally to the seafood processing field, and more specifically to a new and useful system and method for processing a live fish in the seafood processing field.

DETAILED DESCRIPTION

The following description of the embodiments of the invention is not intended to limit the invention to these embodiments, but rather to enable any person skilled in the art to make and use this invention.

1. Overview

Figure 1:
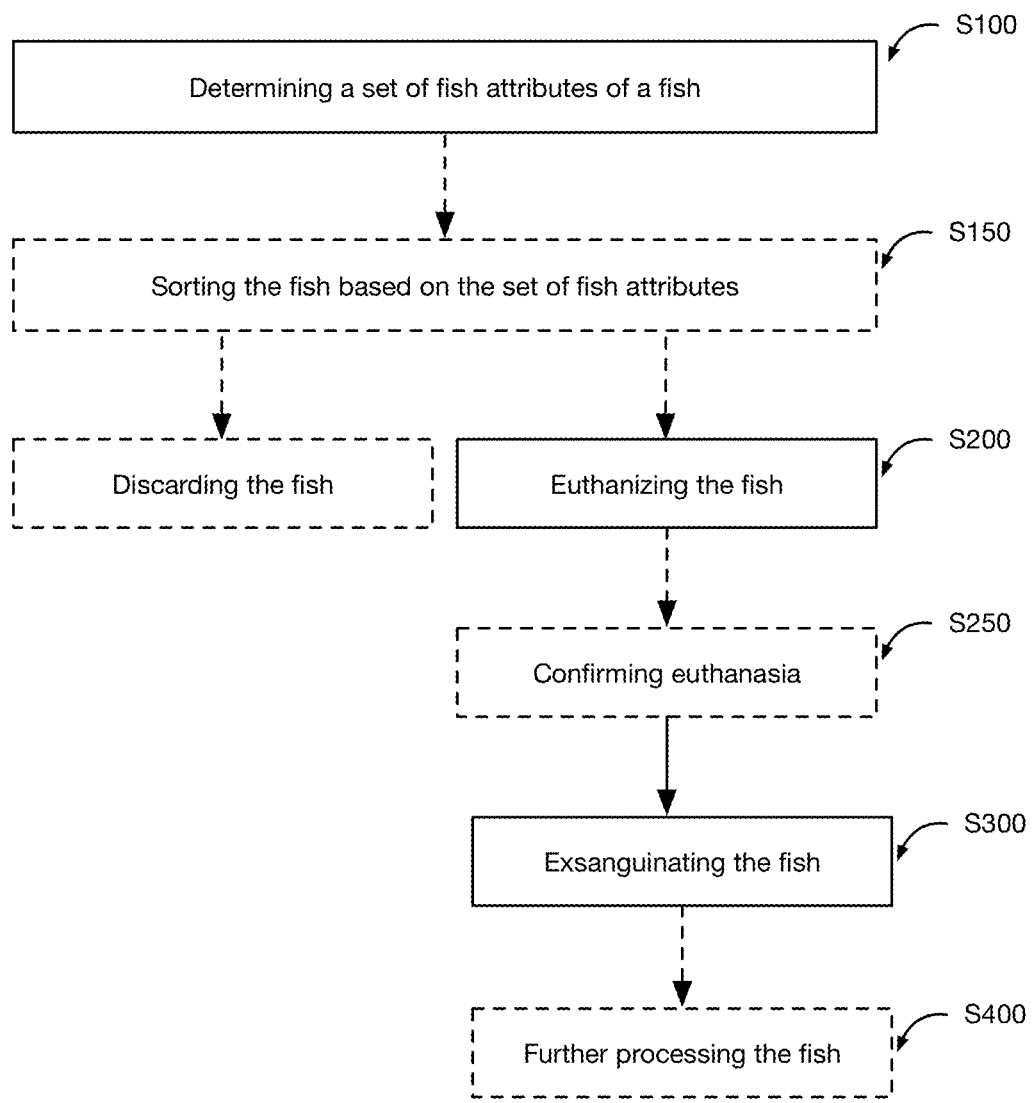
FIG. 1 is a schematic representation of a variant of the method.

As shown in FIG. 1, the method for processing a live fish can include: determining a set of fish attributes of the fish S100, optionally sorting the fish based on the set of fish attributes S150, euthanizing the fish S200, exsanguinating the fish S300, and/or any other suitable steps. In variants, the method can additionally or alternatively include: discarding the fish after sorting, further processing the fish S400, and/or tracking the fish S500. However, the method can additionally and/or alternatively include any other suitable elements.

In an illustrative example, the method can include: receiving a fish, sampling a first set of images of the fish, determining a set of fish attributes (e.g., size, species, etc.) of the fish based on the image S100 using a first set of trained models, optionally sorting the fish based on the attributes S150, and either processing the fish or discarding the fish (e.g., because the species is out of season or the fish is too small).

In the illustrative example, processing the fish can include any or all of: sampling a second set of images of the fish, (e.g., images encompassing a brain region, images of the fish restrained, etc.), determining a euthanasia trajectory based on the first and/or second set of images (e.g., wherein the euthanasia trajectory is approximately perpendicular to the fish head's surface and intersects the fish brain), controlling a set of euthanasia tools to euthanize the fish based on the euthanasia trajectory S200, confirming euthanasia (e.g., via additional imaging and/or other sensor measurements), sampling a third set of images (e.g., exsanguination images), determining an exsanguination trajectory (e.g., exsanguination parameters, one or more cuts along a length of the fish [e.g., a cranial cut, a caudal cut, etc.], one or more cuts along a height of the fish, one or more cuts along a width of the fish, etc.) the first, second, and/or third set of images, controlling a set of exsanguination tools to exsanguinate the fish based on the exsanguination trajectory, and further processing the fish. In optional variants, the method can further include using one or more trained component models to identify one or more locations of fish anatomical features based on any of the sets of imagery, wherein any of the trajectories can optionally be further planned using the locations output by the component models.

In optional variants, the fish and/or final fish container can be identified and associated with the fish attributes, the fish measurements, and/or any other fish information (e.g., cultivation information, harvest information, etc.), with any associated information optionally stored in an enterprise resource planning (ERP) system.

2. Technical Advantages

Variants of the technology for processing a live fish can confer several benefits over conventional systems and methods.

First, fish can display a high degree of variability in size, shape, pattern, and other anatomical features across species and among members of the same species. Variants of the technology can process fish of varying species, size, and anatomical features with consistent results by integrating computer vision into the fish processing pipeline (e.g., to analyze the anatomy and/or attributes of each individual fish), which enables the technology to determine processing parameters that ensure accurate cuts, blows and/or other processes are administered to each fish. This can kill a fish more rapidly, thus ensuring a more humane death than conventional methods.

Second, variants of the technology can yield a higher quality fish product (e.g., flesh, meat, skin, offal, bones, tail, etc.) by reducing or preventing the fish from undergoing stress during processing and prior to euthanasia. The technology can minimize fish stress by shortening a time in which the fish can release stress hormones, keeping the live fish in a stress-free environment (e.g., a dark environment, a wet environment, an environment in which fish swim upstream against a current, etc.), and/or otherwise reduce stress. Reduced fish stress levels can confer the benefits of: reducing suffering of the fish prior to euthanasia, reducing or entirely preventing the fish from releasing stress hormones that may produce lower quality (e.g., tougher) meat, struggling to escape the system (which may inadvertently cause damage to system hardware, and/or other benefits. Variants of the technology can employ techniques, benefits, and/or goals of the ikejime method and/or variants thereof, one of the most humane methods of killing fish, which includes euthanizing fish with one or more sharp blows to the head. The process requires great precision, but results in the lowest levels of stress to the fish and improves food quality.

Third, by automating fish processing, variants of the technology can reduce the need for manual and high-skilled labor, increase the safety of the overall process, and increase processing throughput. Automating the ikejime method and/or variants thereof can further function to increase the precision and successful execution rates thereof, without requiring training more fishermen in the ikejime method.

Fourth, by performing a computer vision analysis to determine a set of fish attributes (e.g., the species and size) of each fish and sorting out any fish that do not meet a specified set of criteria, variants of the technology can facilitate better legal compliance within the fishing industry.

However, the technology can confer any other suitable benefits.

3. System

Figure 2:
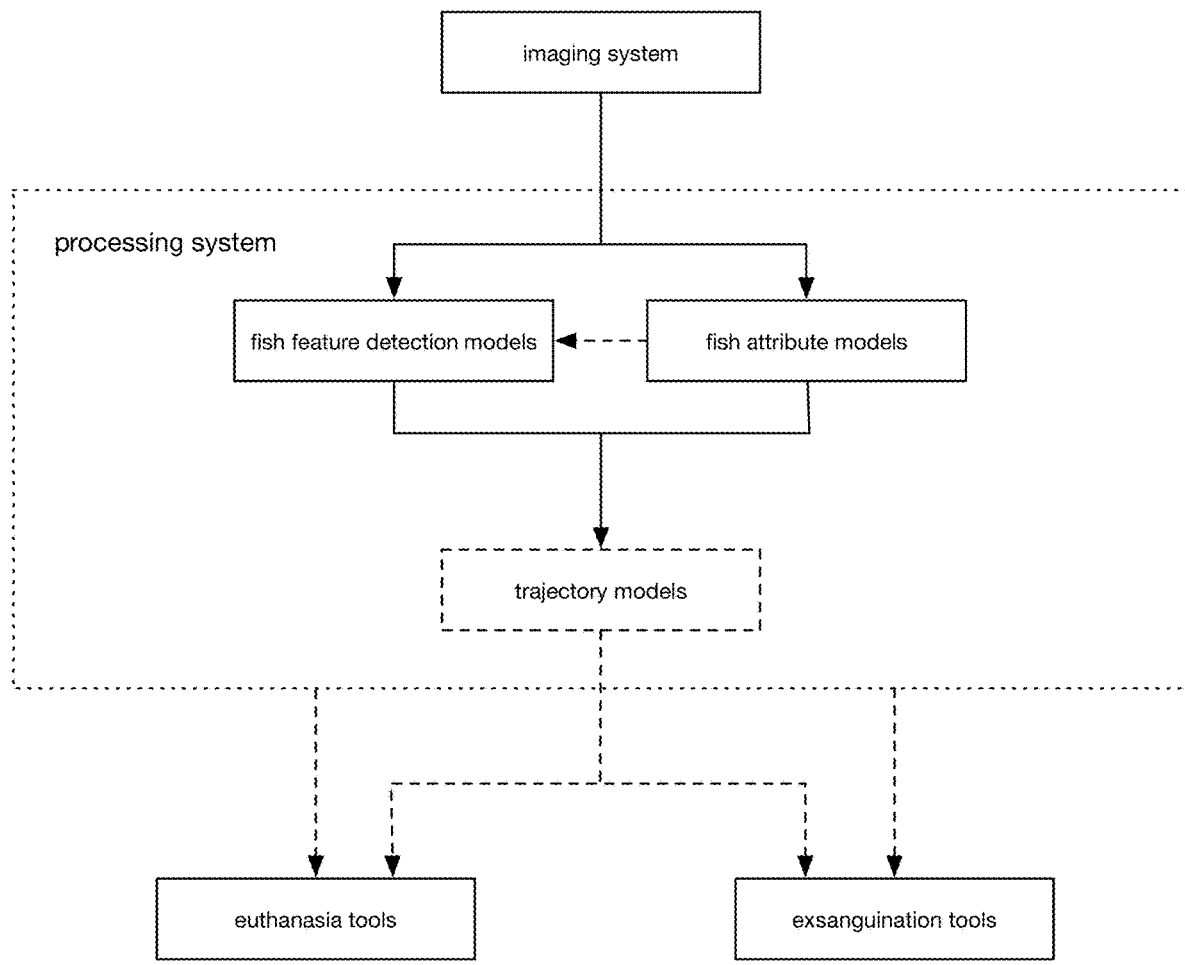
FIG. 2 is a schematic representation of a variant of the system.

As shown in FIG. 2, the system can include and/or interface with: an imaging system, a processing system, a set of tools (e.g., euthanasia tools, exsanguination tools, etc.), a set of models, and/or any other suitable components. Preferably, the system and method can include any of the system, method, and/or constituent components described in U.S. Provisional Application No. 63/451,508, filed 10 Mar. 2023, which is incorporated herein in its entirety by this reference. The system (e.g., a fish processing device) can be located: onboard a vessel (e.g., a marine vessel, a fishing vessel, a ship, a boat, etc.), on land (e.g., on or near a fish farm, in a seafood processing plant, etc.), and/or otherwise located. In optional variants (e.g., when the fish is harvested on a vessel), locating the system directly on a vessel can confer the advantage of further reducing the exposure of the fish to stress or other potential sources of damage, as a live fish can be euthanized and processed immediately upon harvest, rather than being held in a crowded tank for an extended period of time onboard the vessel until being transported to a fish processing facility. Cost and energy (e.g., oil, gas, human labor, etc.) can further be saved as processing the fish directly on the vessel eliminates any costs and energy associated with transporting the fish from the vessel to a fish processing facility.

Preferably, the system includes and/or interfaces with a single fish processing device (e.g., a unified fish processing unit), in which at least fish sorting, euthanasia, and exsanguination are performed within the single fish processing device. Additionally or alternatively, one or more further processing steps (e.g., filleting), all steps of the method, a subset of the steps of the method (e.g., only euthanasia and exsanguination), and/or any other suitable steps can be performed within the single fish processing device. Additionally or alternatively, the system can include multiple fish processing devices (e.g., wherein sorting is performed in a separate device from euthanasia and exsanguination, wherein euthanasia is performed in a separate device from exsanguination, wherein S100-S300 are performed in a separate device from S400, etc.), wherein fish can be automatically and/or manually transferred between the fish processing devices. In variants, each fish processing device can be configured to process: a single fish at a time; multiple fish (e.g., 2, 3, 4, 5, 6, 7, 8, 9, 10, 11, 12, >12, >20, etc.) at a time, for example in parallel (e.g., at parallel stations); and/or any other quantity of fish.

Preferably, all or portions of the method are performed by a local processing system collocated with a fish processing system on-board a shipping vessel. Alternatively, all or portions of the method can be performed by a local processing system affixed to an on-land fish processing system, by a remote system, a third-party system, and/or otherwise performed. The processing system can function to execute one or more processing functions, such as running models, sending control signals to the set of tools, and/or otherwise function.

The system can include one or more models, which can function to: determine fish attributes (e.g. a fish attribute model), determine locations of anatomical features of interest (e.g., a fish component model), determine optimal tool trajectories and/or other parameters (e.g., trajectory models), confirm execution of a method step (e.g., confirm euthanasia), and/or otherwise function. At least a subset of the models (e.g., one or more of the fish attribute models, fish component models, trajectory models, confirmation models, etc.) is preferably specific to at least one of a fish species, fish size parameter (e.g., length, grade, weight, etc.), season, operating context, any other attribute, and/or any other parameter. The specific model can optionally be retrieved based on the respective combination of parameters (e.g., species, size parameter, attributes, etc.). However, any of the models can be generic (e.g., can be applied across all fish species, seasons, sizes, etc.), can be applied across a subset of possible parameters, and/or otherwise applied.

The models can include one or more attribute models (e.g., referred to equivalently herein as fish attribute models), which can function to determine a set of fish attributes.

In examples, fish attribute models can include one or more of: a classifier (e.g., wherein the model classifies a fish species), an object detector (e.g., wherein the model detects or does not detect a fish of a given species), a segmentation model (e.g., more than threshold number of pixels labeled as belonging to a particular attribute class), and/or any other suitable model, and/or any combination of models. Examples of classifiers can be binary (e.g., "fish present" vs. "no fish present"; "in season" vs. "out of season", etc.) or multi-class (e.g., "salmon", "trout", "tilapia", etc.; "species: salmon", "length: 20 in", width: "5 in", etc.). The system can include a different fish attribute model for each attribute, include a single fish attribute model, include an ensemble or cascade of fish attribute models, and/or include any other suitable number of fish attribute models.

The models can optionally include one or more component models (e.g., referred to equivalently herein as fish component models), which can function to determine (e.g., identify, locate, etc.) a region and/or a set of points (e.g., a point, multiple points forming a line, multiple points defining a boundary, etc.) containing anatomical features and/or coinciding with anatomical features (e.g., centerline of a target anatomical feature). Fish anatomical features can include: brains, brain cavity regions, gills, tails, body, body perimeter, belly, heart, gut, liver, spines, fins, spikes, eyes, bulges, patterns (e.g., stripes, spots, etc.), blood vessels (e.g., vessels, arteries, etc.), and/or any other anatomical features and/or regions of the fish. Preferably the component model includes a key point detector that locates a single point (e.g., in 2D space, in 3D space) and/or region where a target anatomical feature (e.g., the centroid thereof) is most likely to be located; however, the component model can additionally or alternatively include: object detectors, neural networks, segmentation models, and/or any other suitable model. The output of the component model can be used: as an input to another model (e.g., trajectory model), for labeling images to train another model (e.g., fish attribute model, trajectory models, etc.), to verify regulatory compliance, to verify successful execution of a method step, and/or otherwise used.

Figure 4:
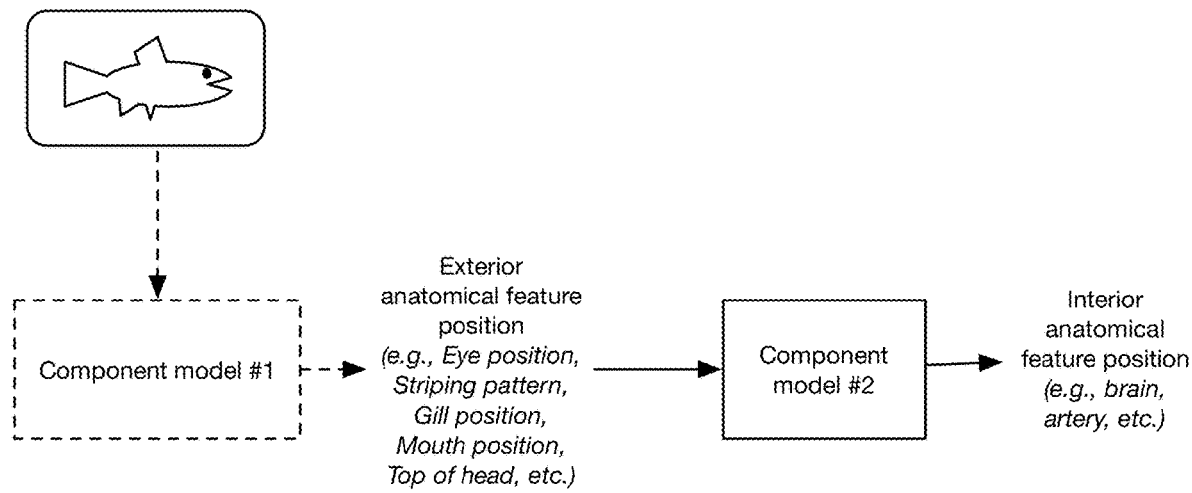
FIG. 4 is a schematic representation of a variant of determining a brain location.

The component model can be used to locate fish anatomical features that are visible within the measurements (e.g., imagery such as red-green-blue [RGB] camera data, infrared data, etc.) of the fish. In variants, the same measurement can be used to determine the location of multiple anatomical features (e.g., a single image to detect both tail and gill location), or multiple measurements can be used to determine different anatomical feature locations (e.g., a tail image, a head image, etc.). Optionally the imagery includes exterior imagery, and the anatomical features are exterior (e.g., defined by and/or located on an exterior surface of the fish, visible to the human eye, etc.). Additionally or alternatively, the imagery includes interior (equivalently referred to herein as "internal") imagery (e.g., x-ray, ultrasound, etc.) and the anatomical features are interior and/or exterior. Additionally or alternatively, the component model can be used to locate fish anatomical features not visible within the imagery (e.g., because the imagery is exterior imagery of the fish such as RGB, infrared, etc.). In a first example, the component model directly outputs the set of non-visible anatomical features based on the measurements. Optionally, in the first example the component model can implicitly deduce key visible anatomical features (eye, contour, mouth, operculum etc.), and then implicitly compute a best estimate of the target non-visible feature (e.g. brain) based on learned relations during model training. In a second example, a first set of component models is used to determine a set of visible anatomical features, and then a second set of component models is used to determine the set of non-visible anatomical features based on the output of the first set of component models (e.g., example shown in FIG. 4). In a particular example, for instance, the imagery can include exterior imagery which detects external features (e.g., landmarks, anatomy, etc.) that can be used to deduce interior features (e.g., arteries, brain, brain cavity, spinal cord, etc.) such as based on predetermined associations, based on learned associations, and/or any other associations or combination of associations. The component model can predict a location based on an image of the fish, and/or based on a set of features extracted by a prior component model. In an illustrative example, the brain location is determined to be at a specified distance from the intersection of two specific stripes (e.g., wherein the stripes are detected using the prior fish component model). In another illustrative example, the brain location is determined to be at a specified distance from and eye and a feature on the head contour (e.g., wherein the eye and head contour are detected using the prior fish component model).

The models can include one or more trajectory models. In examples, trajectory models can include a euthanasia trajectory model, an exsanguination trajectory model, a post-processing trajectory model (e.g., a fillet trajectory model, etc.), and/or any other suitable trajectory model.

Figure 16:
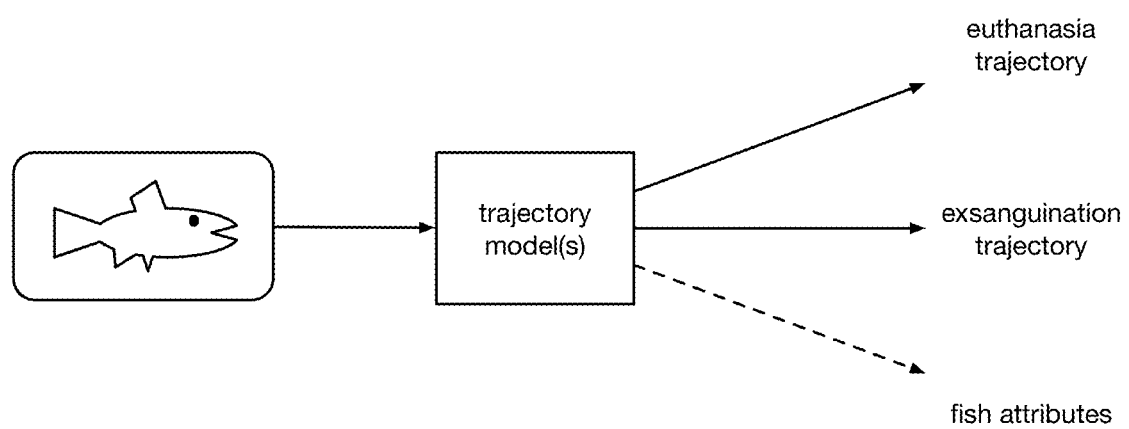
FIG. 16 is a schematic representation of a variant of determining a set of trajectories.
Figure 17:
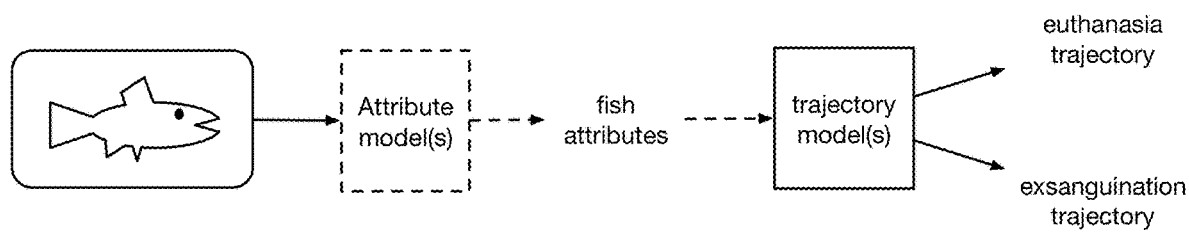
FIG. 17 is a schematic representation of a variant of determining a set of trajectories.

In variants, trajectory models can function to determine a set of tool parameters with which to operate a tool to execute a process and/or step (e.g., euthanasia, exsanguination, processing, etc.). In examples, tool parameters (e.g., euthanasia tool parameters, exsanguination tool parameters, processing tool parameters, etc.) can include: tool trajectories and/or portions thereof (e.g., position(s), velocity(ies), acceleration(s), angle(s), etc.), orientation, feed rate, speed, tool type, force, revolutions per minute (e.g., of a cutting blade, of a drill, etc.), parameters of contact between a tool and a target fish (e.g., point(s) of contact, angle(s) of contact, etc.), and/or any other parameters related to the control of a robotic tooling (e.g., cutting) element. The trajectory and/or any other tool parameters can be subject to constraints (e.g., minimum and/or maximum depth and/or length of cut, etc.) and/or targets (e.g., maximizing a quantity of harvestable meat, minimizing a tool load, etc.) that are determined based on fish species, fish size, user-determined, based on machine and/or tool specifications, predefined, the set of measurements, and/or otherwise determined. The trajectory can optionally intersect one or more target anatomical features (e.g., gills, tail, belly, brain, artery, etc.). In variants, the trajectory models determine the set of tool parameters for one or more operations (e.g., euthanasia trajectory, exsanguination trajectory, etc.) based on the set of measurements (e.g., images) of the fish, as shown in an example in FIG. 16. Additionally or alternatively, the trajectory models can determine the set of tool parameters for one or more operations (e.g., euthanasia trajectory, exsanguination trajectory, etc.) based on the output of one or more other models (e.g., attribute models, component models, etc.), as shown in an example in FIG. 17. The measurements can be sampled in a known reference frame (e.g., the workstation coordinate system), and the locations of key anatomical features (e.g., as determined by the component models) can be transformed into a tool reference frame (e.g., a euthanasia tool reference frame, an exsanguination tool reference frame, etc.). In a specific example, the trajectory model can locate an optimal toolpath (i.e. set of points), which can optionally coincide with the centerline of a target anatomical feature (e.g., as detected by the component model, as inferred implicitly by the trajectory model, etc.).

Examples of models can include: computer vision models, neural networks (e.g., CNN, DNN, etc.), convolutional neural network-based models (e.g., region-based convolutional neural networks (R-CNN), fast R-CNN, faster R-CNN, region-based fully convolutional network (R-FCN), etc.), object detectors (e.g., CNN-based algorithms, You Only Look Once (YOLO) algorithms, Single Shot Detector (SSD) algorithms, Single Shot Multibox Detector algorithms, Histogram of Oriented Gradients (HOG), etc.), transformer-based methods (e.g., vision transformers (ViT), etc.), segmentation models (e.g., thresholding algorithms, clustering algorithms, instance-based segmentation, semantic segmentation, etc.), comparison models (e.g., vector comparison, image comparison, etc.), key point detectors, clustering, selection and/or retrieval (e.g., from a database and/or library), equation-based methods (e.g., weighted equations), regressions (e.g., leverage regression), rules or heuristics, classical approaches (e.g., SIFT, HOG, edge detectors, etc.), classification models and/or algorithms (e.g., binary classifiers, multiclass classifiers, semantic segmentation models, instance-based segmentation models, etc.), instance-based methods (e.g., nearest neighbor), regularization methods (e.g., ridge regression), decision trees, Bayesian methods (e.g., Naïve Bayes, Markov, etc.), kernel methods, statistical methods (e.g., probability), deterministics, support vectors, other machine learning models, other models, and/or any combination of models, algorithms, and/or tools.

In examples, any of the models (e.g., all or a subset thereof) can be trained on training data including a set of labeled measurements (e.g., a plurality of images depicting a plurality of fish). In variants, labels can include: locations of desired cuts and/or any other cut parameters (e.g., depth of cut, position of cut along length of fish, angle of cut, trajectory parameters, etc.), locations of anatomical features of interest (e.g., features visible on the fish exterior such as eyes, features not visible on the fish exterior such as the brain, etc.), trajectories (e.g., including tool parameters, tool target points, etc.), attributes (e.g., attribute values), and/or any other training data.

Labels can be manually-generated, computer-generated (e.g., by a trained model), and/or otherwise generated. In variants, labels can be determined based on one or more secondary measurements. In examples, taking the secondary measurements can include: weighing the fish, measuring a physical fish (e.g., for length, thickness, width, etc.), sampling a secondary image using the same or different imaging modality as the labeled image, sectioning the fish, and/or any other suitable techniques. Optionally, measurements can be sampled of the fish before and after processing (e.g., wherein the fish are retained in the same position and/or visual key points are retained for subsequent image alignment).

Figure 14:
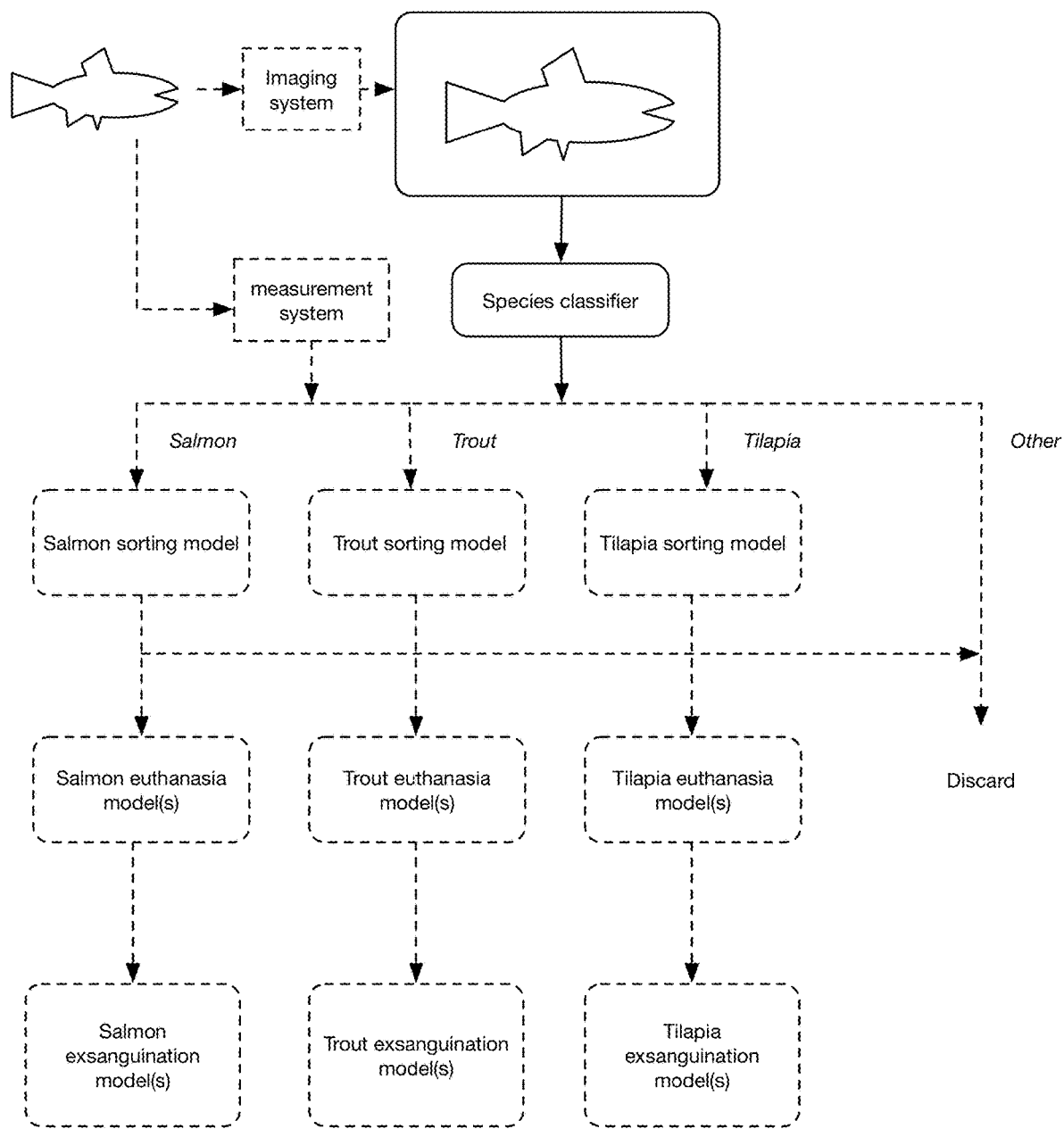
FIG. 14 is a schematic representation of a species-specific variant of the method.

In examples, any of the models (e.g., all or a subset thereof) can be trained on training data including measurements of a single type of attribute and/or set of attributes (e.g., for models that are specific to a set of one or more fish attributes), and/or a plurality of fish attributes. In a specific set of examples (e.g., pictured in FIG. 14), the system can include one or more models that are specific to a species. Any or all of the models can be trained on measurements (e.g., images) of the specific species and/or of the specific species in addition to one or more other species (e.g., that share a common anatomical pattern). Additionally or alternatively, any or all of the models can be trained on measurements of a specific size attribute (e.g., grade, length, weight, etc.), and/or any other suitable attribute.

Optionally, any or all of the models can be trained using transfer learning techniques (e.g., pre-training, fine tuning, transfer of knowledge, adapting, evaluation, refinement, modifying weights, modifying pre-training weights, etc.). In a first example, a first set of models can be trained on measurements including fish with a first combination of fish attributes such as species, size attributes, and/or any other suitable attribute to perform a first task (e.g., identifying the first combination of fish attributes). A second set of models (e.g., the same as or distinct from the first set) can subsequently be trained for a second task on a second set of measurements including fish with a second combination of fish attributes, using knowledge gained during training of the first set of models, to perform a second task (e.g., identifying the second combination of fish attributes). In a second example, a first set of models can be trained on measurements of a first measurement parameter (e.g., measurement type, image angle, measurement quality, etc.) for a first task, and a second set of models (e.g., the same as or distinct from the first set) can subsequently be trained for a second task (e.g., the same as or distinct from the first task) using knowledge gained during training of the first set of models. In a specific variant of the second example, the first set of models are trained on images of a first measurement type (e.g., images in a color scale such as red-blue-green, x-ray, etc.), and transfer learning techniques are applied to enable the second set of models to make perditions based on images of a second measurement type (e.g., greyscale, infrared, etc.).

Optionally, transfer learning can be used to extend a trained model to one or more of: another fish attribute (e.g., species, size, grade, etc.), another animal (e.g., pig, cow, etc.), another measurement type, another machine configuration (e.g., tool types, tool configurations, sensor types, sensor configurations, etc.), another target trajectory, another euthanasia methodology (e.g., stunning, ikejime, beheading, etc.), any other processing methodology (e.g., exsanguination, filleting, etc.), and/or any other suitable parameter.

Optionally, any or all of the models can be updated over time based on new data (e.g., labels manually generated by users, customer reviews, etc.). New data can optionally be added to a data repository used for training.

The models can be trained using: self-supervised learning, semi-supervised learning, supervised learning, unsupervised learning, reinforcement learning, transfer learning, Bayesian optimization, positive-unlabeled learning, using backpropagation methods, and/or otherwise learned. The model can be learned or trained on: labeled data (e.g., data labeled with the target label), unlabeled data, positive training sets (e.g., a set of data with true positive labels), negative training sets (e.g., a set of data with true negative labels), and/or any other suitable set of data. In a first variant, different models can be trained for different fish species, sizes, and/or other parameter values. In a second variant, a general model can be trained on generic datasets (e.g., in the same or different domain; trained on datasets including different fish species, sizes, and/or other parameter values, etc.; trained on a first set of measurement types; etc.), and then tuned to create specific models (e.g., using transfer learning) for a specific fish species, fish size, a step of the method, system configuration, a second set of measurement types, and/or any other parameters. In a third variant, different models can be trained for the same set of fish parameters, wherein the model outputs can be weighted or selected (e.g., based on the model accuracy). However, the models can be otherwise trained or configured. Model inputs can include: one or more of the measurements described above, anatomical features or attributes extracted by another model, and/or other inputs.

However, the system can include any additional or alternative elements, and/or be otherwise configured.

4. Method

As shown in FIG. 1, the method can include: determining a set of fish attributes of a fish S100, optionally sorting the fish S150, euthanizing the fish S200 and exsanguinating the fish S300. In variants, the method can additionally or alternatively include: discarding the fish after sorting, further processing the fish S400, tracking the fish S500, and/or any other suitable elements. The method can function to process a live fish, any other maritime animal, any other animal (e.g., chicken, pigs, cows, etc.), and/or otherwise function. In examples, the fish and/or other maritime animal can include: salmon, trout (e.g., rainbow trout, brown trout), tilapia, tuna (e.g., yellowfin, albacore, bluefin), carp, cod, haddock, mackerel, sardines, anchovies, bass (e.g., striped bass, largemouth bass), perch, sole, marlin, pike, whitefish, sturgeon, eel, swordfish, flounder, catfish, pollock, snapper, grouper, mahi-mahi (dolphinfish), halibut, herring, clams, lobster, crab, octopus, shrimp, squid, mollusks, and/or any other suitable species.

One or more instances of the method can be performed for one or more fish, one or more fish species, one or more sizes of fish, and/or other varieties of fish. Different instances of the method can be performed concurrently (e.g., in parallel) for multiple fish, sequentially for multiple fish, and/or in any other suitable order.

All or portions of the method can be performed: in response to a request (e.g., a user selection), automatically (e.g., upon determining the presence of a fish in a fish processing system), and/or at any other suitable time.

Preferably, each step (equivalently referred to herein as a process) of the method is performed at a station (e.g., a chamber) configured for that step (e.g., wherein each station is located within a single fish processing device, wherein two or more stations are located at separate standalone fish processing devices, etc.), such that the method is simultaneously performed (in series) for multiple fish which pass from station to station. Additionally or alternatively, a single fish can be processed at a time, wherein stations before and after the current step can remain empty. Additionally or alternatively, one or more steps can occur within the same station. In variants, the system can additionally or alternatively be configured to process fish in parallel (e.g., wherein multiple stations of the same type are lined up next to one another within a single fish processing device).

All or portions of the method can be performed using measurements of the fish. Measurements can include: imagery (e.g., images, RGB imaging, stereo images, video, 2D imaging data, 3D imaging data, etc.), depth measurements (e.g., point clouds, etc.), force (e.g., weight), pressure, vibration, strain, displacement, acceleration, tactile measurements, audio, electrical signals, and/or any other suitable measurement. In variants, all or a subset of imagery sampled by the system can include imagery that does not require a lighting source (e.g., x-ray imaging, infrared imaging, thermal imaging, microwave imaging, radar imaging, ultrasound imaging, radio imaging, computed tomography imaging, etc.), which can confer the benefits of: enabling a live fish to be imaged within a closed, dark container, and thus reduce stress levels of the fish upon entering the system; reducing system complexity and/or cost (e.g., without the need to integrate lighting sources, replace lighting sources, etc.); and/or any other suitable benefits. In variants, internal imaging (e.g., x-ray imaging, ultrasound imaging, computed tomography imaging, etc.) can confer the benefit of providing a more detailed view (e.g., as compared to external imagery) of internal anatomical features (e.g., brain, arteries, etc.), which may reduce a more accurate determination of the locations of internal anatomical features and/or reduced model complexity. In specific examples, for instance, internal imaging can target the particular anatomy (e.g., artery location) desired to be cut rather than indirectly targeting the anatomy through external feature (e.g., gill) detection, thereby increasing an accuracy of the cut, maximizing an amount of undamaged fish meat able to be utilized, and/or otherwise optimizing an outcome of the process.

The method can include sampling one or measurements using a measurement system including a set of sensors (e.g., an imaging system as shown in FIG. 2). Types of sensors can include: cameras or other optical sensors, tactile sensors (e.g., embedded in a strap), scales, force sensors, displacement sensors, tensiometers, pressure sensors, vibration sensors, current sensors, voltage sensors, ECG, and/or any other sensors. Each processing stage (e.g., step) of the method can include one or more sensors (e.g., of the same and/or different type). The sensors can be collocated with a fish processing workstation that contains the fish which has front, rear, top, bottom, left and right sides. Sensors can be arranged along any of the sides of the workstation, at the intersection of any sides of the workstation, at any angle relative to the workstation, within the workstation, outside of the workstation, and/or otherwise collocated with the workstation.

Preferably, measurements are sampled in a controlled environment (e.g., controlled lighting, unobstructed field of view, controlled position and/or pose relative to a reference frame, etc.) that can optionally match the environment for a set of training data, but can alternatively be taken in an uncontrolled or partially controlled environment. The controlled environment can optionally be specific to a sampling station (e.g., associated with a specific step of the method), specific to a set of fish attributes (e.g., species), and/or otherwise specified. Preferably, sensors are calibrated within a common coordinate frame (i.e., sensor coordinate frame calibrated to a relative arrangement of the fish processing system) in a fixed and/or predetermined arrangement relative to a (joint) coordinate frame of a robot assembly module, but can be otherwise suitably configured.

Measurements can be sampled for a live fish, a dead fish, and/or a fish both before and after death. A different set of measurements can be sampled for each step (e.g., example shown in FIG. 9); additionally or alternatively, different steps can use the same set of measurements and/or information extracted therefrom. Measurements can be sampled when a fish is retained (e.g., held in a fixture, referred to equivalently herein as restrained, etc.), immobilized, and/or unrestricted. In variants, an unrestricted live fish can be out of water, or alternatively swimming in a controlled stream of water. Measurements can be sampled from: the fish side, bottom, top, front, back, from an isometric view, and/or from any other suitable angle relative to the fish.

In an example, images are sampled of a fish restrained in a fixture at a station of the method from a fixed camera pose relative to the fixture configuration. In another example, tactile measurements for a restrained fish can be sampled to determine the size of the fish. A sensor can be affixed to a fixture (e.g., a strap, a rotating arm, etc.) and a displacement (e.g., angle, axial, etc.) from a baseline position can be measured to determine the girth of the fish.

Figure 11:
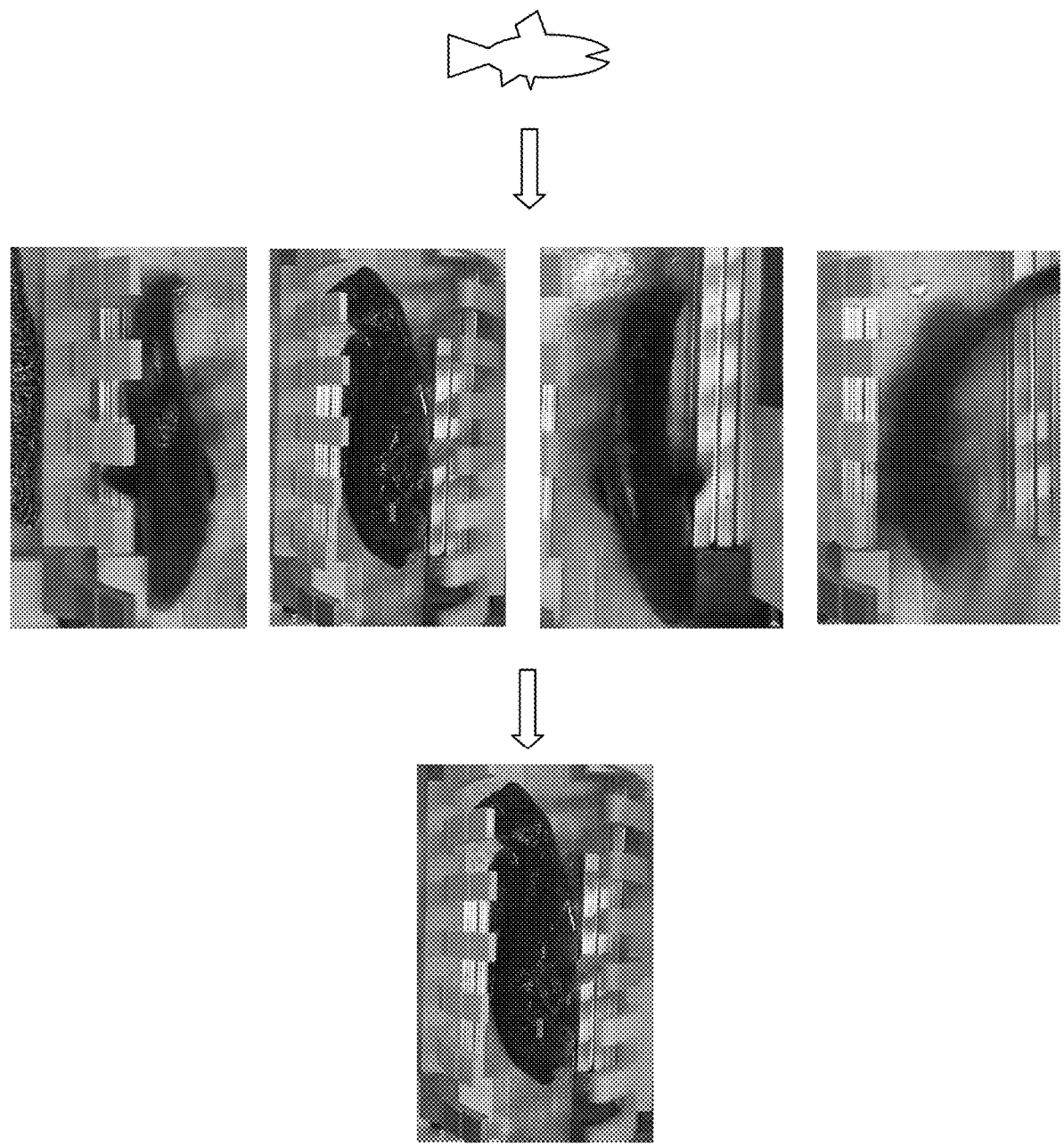
FIG. 11 is an illustrative representation of selecting a subset of sampled images of a fish.

The method can optionally include selecting a subset of the measurements obtained to perform an analysis task (e.g., determine a parameter value) for any or all steps of the method (e.g., example shown in FIG. 11). Selecting a subset of measurements can function to determine a set of measurements that meet a set of specifications (e.g., for resolution, quality, anatomical features included, taken in a sufficiently controlled environment, etc.) to ensure uniformity in analysis and/or consistency with a set of training data. Selecting a subset of the measurements can be based on: visibility of key fish anatomical features (e.g., eyes, fins, head, tail, gills, full profile, etc.; wherein each anatomical feature from an expected anatomical feature set is detected in a single image), visibility of the fish (e.g., obstruction by obstacles, perspective, etc.), quality of the obtained measurement (e.g., resolution, maximum noise threshold, whether or not moisture has collected in the restraining mechanism and thereby obstructed any or all of the fish, etc.), and/or any other set of specifications. In a first variant, a model is used to determine a single measurement (e.g., the measurement best suited for a specific analysis task) from a set of measurements. In a second variant, a model is used to determine multiple measurements (e.g., all suitable measurements) from a set of measurements, and the method can subsequently include determining parameters by aggregating (e.g., averaging) the selected measurements or selecting the best subset of measurements from the selected measurements. In a third variant, one or more measurements can be continuously sampled and assessed using a model until a suitable measurement is sampled. However, in alternatives all measurements sampled can be used for analysis (e.g., wherein a single measurement is sampled to determine a single parameter, wherein multiple measurements are sampled to determine a single parameter and all measurements are aggregated to determine the parameter value, etc.).

Optionally, one or more measurements can be sampled from a specific measurement configuration that can ensure visibility of one or more target anatomical features (e.g., for determining a trajectory, for determining fish attributes, etc.). In an example, a first set of images are sampled of a first view (e.g., a bottom side profile) of the fish from a first configuration (e.g., below the base of the workstation) that has a clear view of a first set of anatomical features (e.g., gills, underbelly, etc.). The first set of images can be processed with a first set of models (e.g., a first set of attribute models, trajectory models, component models, etc.) to produce a first set of outputs. Optionally, a second set of images are sampled of a second view (e.g., side profile) of the fish from a second configuration (e.g., a side of the workstation) that has a clear view of a second set of anatomical features (e.g., tail, fins, jaw, etc.). The second set of images can be processed with a second set of models to produce a second set of outputs. Further images can optionally be sampled with different parameters (e.g., camera angles, measurement modalities, etc.) to detect additional features of interest. However, imagery can be taken from any other suitable orientation.

In alternative variations, images can be taken from a single direction (e.g., side view, top-down view, head-on view, bottom-up view, etc.) of the fish, such as when restrained in a translucent fixture.

One or more models (and/or the functionality thereof described herein) can be executed concurrently, contemporaneously, asynchronously, and/or in any other suitable order. One or more models can be executed for the same fish, for different fish, for the same processing stage, and/or different processing stages.

Additionally or alternatively, the method can be otherwise suitably executed.

4.1 Determining a Set of Fish Attributes of a Fish S100.

Determining a set of fish attributes of a fish S100 can function to determine a set of fish attributes which can be used by the automated fish processing system to inform decision-making at a subsequent step or steps of the method.

Determining a set of fish attributes of a fish can include: receiving a live fish, determining a set of data of the fish (e.g., equivalently referred to herein as determining a set of measurements of the fish) and determining the set of fish attributes based on the set of data. Determining the set of measurements of the fish can include sampling the measurements, receiving the measurements (e.g., from an imaging system), and/or otherwise determining the measurements.

At one or more times during the method (e.g., prior to sorting the fish), measurements can be sampled without fixturing (e.g., referred to equivalently herein as 'restraining') the fish. In an example, measurements (e.g., images) are sampled of an un-fixtured (e.g., unrestrained) fish in a corral filled with water. The water can be static, moving (e.g., selectively flowing along an axis to direct the fish to swim along said axis), misted, sprayed, and/or otherwise configured. Additionally or alternatively, at one or more times during the method (e.g., during sorting, prior to and/or after euthanasia, exsanguination, further processing, etc.) measurements of the fish are sampled while the fish is fixtured or otherwise restrained.

The method can include collecting a first set of measurements (e.g., imagery) contemporaneously with restraining the live fish. Preferably, at one or more times during the method, measurements are sampled of a live fish (e.g., prior to sorting, prior to euthanasia, etc.). Additionally or alternatively, measurements can be sampled of the fish after it is euthanized (e.g., prior to exsanguination, further processing, etc.). Additionally or alternatively, measurements can be sampled of an item (e.g., a received dead fish, debris, etc.) that is not a live fish (e.g., wherein the item is subsequently sorted out and discarded in step S150). However, measurements can be sampled at any other time(s) and/or of any other items.

Determining the set of fish attributes based on the set of measurements can be performed by using one or more fish attribute models to determine a set of fish attributes (e.g., referred to equivalently herein as attributes). Examples of fish attributes that can be determined include: species, size, length, shape, weight, seasonality, quality metrics, and/or any other fish attribute. In examples, quality metrics can include: color, skin shininess, gill quality (moistness, color, shine, etc.), eye quality (color, brightness, cloudiness, sunken eye, etc.), rigidity, scale loss, parasites, blood clots, visual defects, and/or any other quality metrics. In examples, any fish attributes can include desirable (e.g., target) or undesirable fish attributes. In examples, fish attributes can be categorized as a continuous quantity (e.g., a percentage, a continuous value, etc.), as a discrete quantity (e.g., binary above/below threshold, bucket, quantile, etc.), and/or otherwise categorized.

Fish attributes can additionally or alternatively include an alignment of the fish relative to the system such as orientation, position, jamming, and/or any other relative attributes, which can inform how well the fish is suited (in its current state) for further processing and/or whether or not the fish should be removed from further processing, reoriented prior to further processing, and/or otherwise manipulated.

S100 can be performed using a fish attribute model, a combination of models, and/or can be performed using any other suitable model(s). The output of S100 can optionally be used to sort the fish (e.g., to determine whether the fish will be processed by the system or released), to euthanize the fish, to exsanguinate the fish, to perform any further processing of the fish, and/or otherwise used.

In variants, the fish attributes can be inferred from an image of the fish, using a set of trained fish attribute models. In a first example, the fish attributes (e.g., species, class, etc.) can be determined using a classifier (e.g., an image classifier). In a second example, the fish attribute model can determine a bounding box surrounding the fish, wherein the fish dimensions can be determined based on the bounding box dimensions, and/or the fish weight can be estimated based on the fish dimensions (e.g., using a lookup table, based on the species, etc.). In further variants, fish attributes can be estimated based on measurements (e.g., fish weight inferred from the estimated fish volume determined from a stereo image).

Optionally, S100 can include using a set of fish attributes output by a first set of models (e.g., fish attribute models) to inform the selection of a second set of models and/or as parameters (e.g., model weights, model parameters, etc.) that affect the output of the second set of models. In variants, S100 can include determining the fish species prior to determining subsequent fish attributes, which can confer the benefit of accounting for a high degree of interspecies fish variability. In additional or alternative variants, S100 can include determining the fish species and an additional fish attribute (e.g., size, grade, etc.), which can confer the benefit of accounting for a high degree of intraspecies fish variability.

In an example, S100 can include using a first set of models to determine a first set of fish attributes, including at least the fish species and optionally further including the fish size and/or any other suitable attributes. Based on the fish species and/or the other suitable attributes, a second set of models can be selected to determine a second set of fish attributes (e.g., fish size, quality metrics, etc.). In an example shown in FIG. 14, after classifying the fish species with a first model, subsequent models (e.g., for sorting, euthanasia, exsanguination, etc.) are retrieved that are specific to the fish species. Additionally or alternatively, the fish species and/or the other suitable attributes can be provided as a set of input parameters to the second set of models.

In a first variant, a first model is used to determine multiple fish attributes (e.g., species and size) from the same measurement set (e.g., to perform multi-label classification). Optionally, the output of the first model can further inform the selection and/or the output of a second set of models. In one example, a first set of models determines a species and size of the fish, wherein any or all subsequent models (e.g., euthanasia model, cut trajectory models, etc.) utilize both the species and size to determine optimal trajectories. For instance, in some cases, intricacies of how fish within a particular species grow can be used along with that fish's size to optimally euthanize and cut the fish (e.g., in a manner that is not simply scaled down relative to a larger fish in that species).

Figure 10:
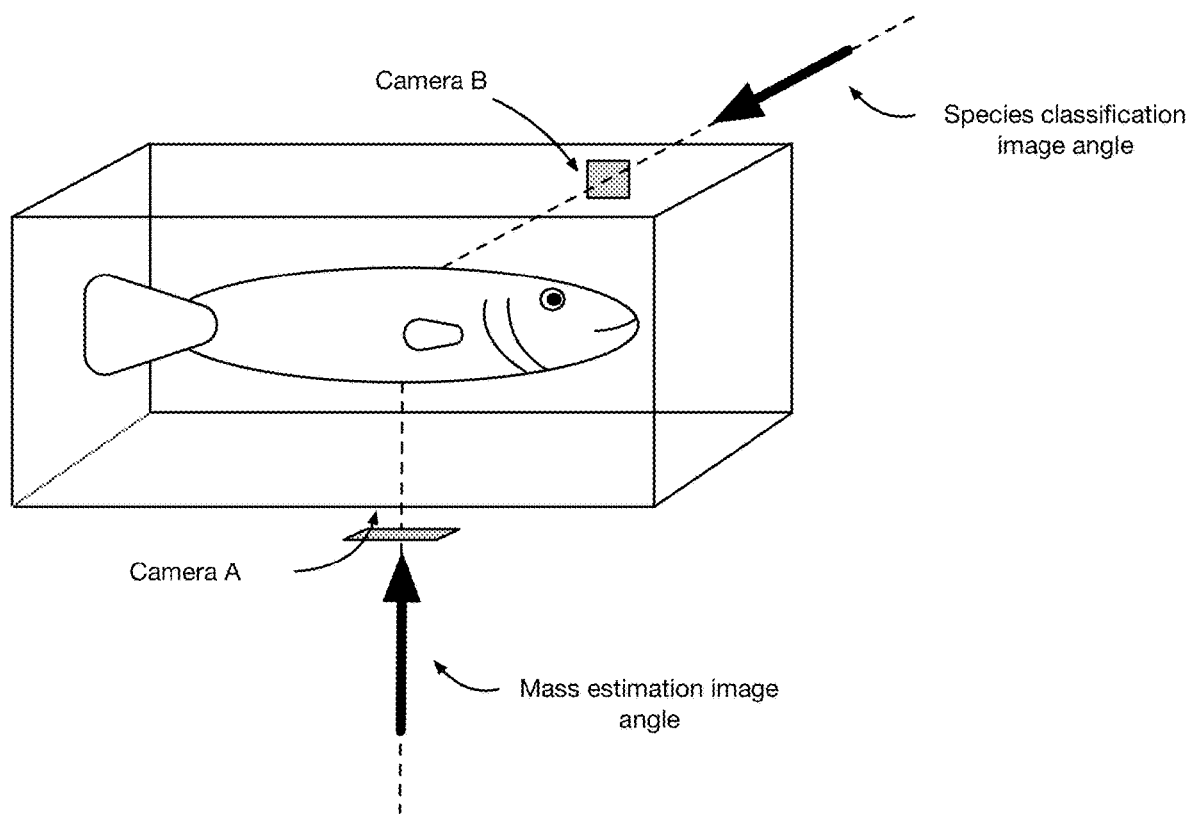
FIG. 10 is an illustrative representation of mass estimation using an imaging system.

In a second variant, a set of multiple models are used to determine a set of multiple fish attributes from different measurement sets. In examples, different measurement types, and/or sampling methodologies (e.g., camera vantage point) can be used to determine different fish attributes. In a first specific example, the species is determined from a first measurement type (e.g., a single image, an RGB image, an infrared image, etc.) using a first set of models, while a second attribute (e.g., weight, density, etc.) is determined from a second measurement type (e.g., two or more images using stereo vision techniques, 3D imaging, a scale reading, etc.) using a second set of models. In a second specific example, the fish species is determined from an image depicting the fish profile using a first set of models, while the fish mass is determined from an image depicting the underside of the fish (e.g., example shown in FIG. 10) using a second set of models. Optionally, the output of the first model can inform the selection and/or the output of the second set of models.

In a third variant, sequential models are used to determine attributes and filter out fish that do not meet the processing requirements (e.g., from the same and/or different measurement set). In an example, a first model is used to determine the fish species, and a second model is used to determine the fish size only if the species meets a set of processing requirements. Optionally, additional models can be used to determine additional attributes if the species and/or size meet the requirements.

However, determining a set of fish attributes of a fish can be otherwise performed.

4.2 Sorting the Fish S150.

The method can optionally include sorting the fish S150, which can function to determine whether the fish meets a set of processing requirements. S150 is preferably performed after S100, but can additionally or alternatively be performed at any other suitable time. In examples, the method can optionally include verifying a set of one or more processing requirements (e.g., system processing requirements) prior to performing each subsequent step of the method.

Sorting the fish can be based on a set of intake measurements (e.g., imagery), which are preferably sampled prior to restraining the live fish, but can additionally or alternatively be sampled after restraining the live fish. Sorting the fish is preferably performed in an intake station (e.g., a corral subsystem) wherein the fish is only allowed to pass to a station where S200 is performed if the fish meets the set of processing criteria, but can additionally or alternatively be performed at a same station as S200, and/or otherwise performed.

Processing requirements can include: regulatory requirements, system processing requirements, quality requirements, market requirements (e.g., types of fish the users of the system desire/don't intend to process), safety requirements (e.g., verifying that no non-fish items such as human hands, human fingers, debris, are present before implementing additional processes, etc.), and/or any other suitable requirements. The processing requirements can be generic, dependent on a set of one or more fish attributes (e.g., species, size, etc.), specific to a context (a region, a vessel, and/or a season in which the method is performed, etc.), specified by a user (e.g., through a user interface), specified by the system (e.g., a default setting), and/or otherwise specified.

Examples of regulatory requirements can include: fishing seasons (e.g., by species), size limits for targeted species (e.g., length, weight, total length, fork length, standard length, curved fork length, eye-fork length, head length, minimum size thresholds that must be exceeded, etc.), catch limits (e.g., by species), and/or any other suitable regulatory requirements. Optionally, the system can interface (e.g., by satellite, API, radio, internet, etc.) with an external computing system and/or database to retrieve regulatory requirements based on the location in which the system is being used.

Examples of system processing requirements can include: the detection that a fish is present, a set of one or more fish types (e.g., species) the system is equipped or unequipped to process; a minimum fish size; a maximum fish size; a range of fish sizes; a requisite size, symmetry (e.g., spine alignment, on opposing sides of the sagittal plane, etc.), position, or orientation of one or more anatomical features; a requisite alignment of the fish relative to the system (e.g., fish is upright, fish is oriented forward within the fish processing unit, fish is properly secured by a restraint, etc.), which can optionally be specified to a certain tolerance (e.g., nose of fish within a prespecified number of degrees of a target angle such as <90°, <75°, <60°, <45°, <30°, <15°, <5°, <1°, etc.); desired quality metrics and/or lack of defects (e.g., abnormal mass, parasites, diseases, etc.); and/or any other combination of fish attributes that the system is equipped or unequipped to process.

Example quality requirements can include: that the fish is alive, that the fish is healthy (e.g., as indicated by quality metrics determined in S100), compliance with a set of desired quality metrics, an absence of a set of undesired quality metrics (e.g., parasites, visual defects, scale loss, etc.), and/or any other suitable quality requirements.

Figure 8:
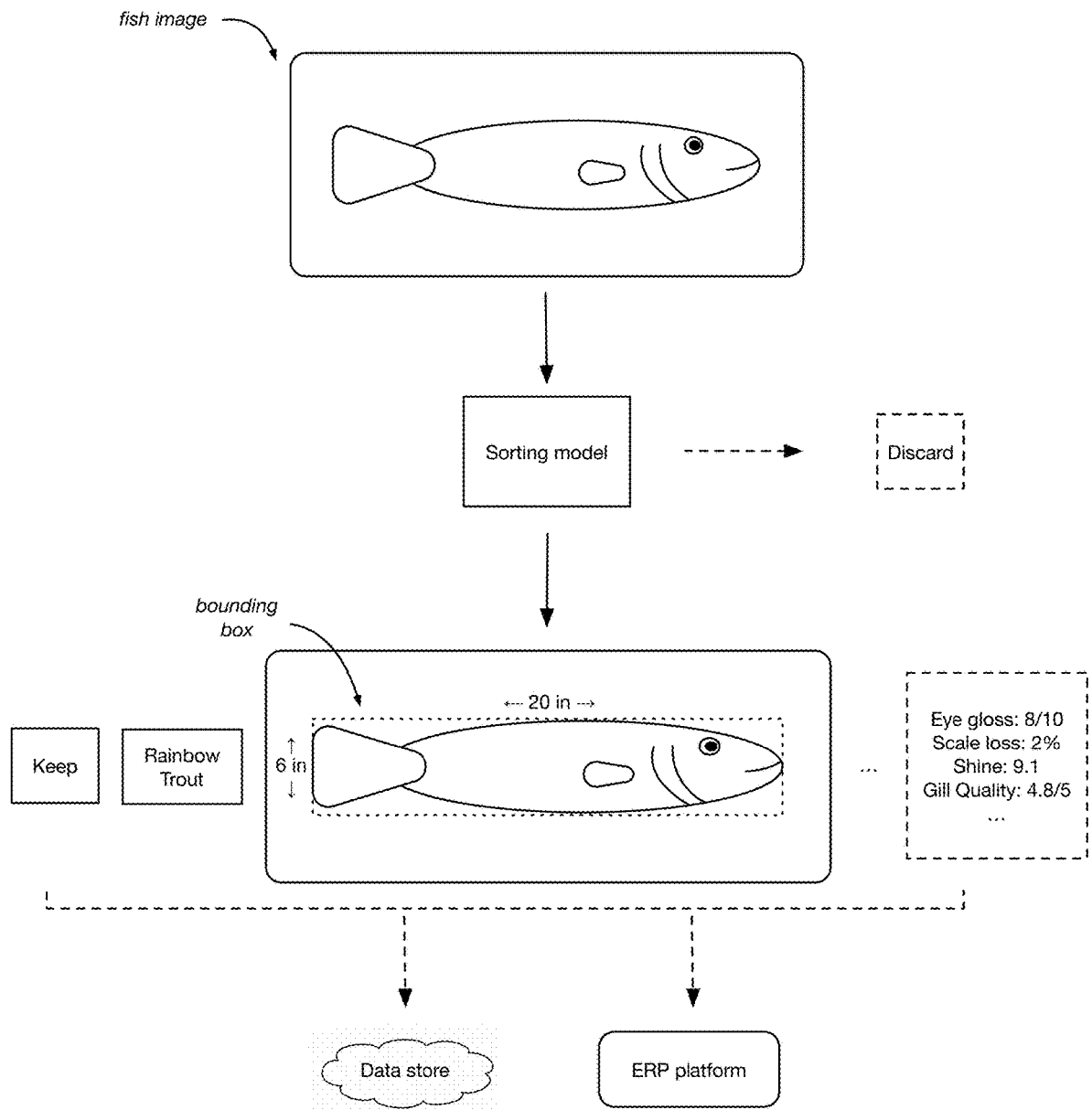
FIG. 8 is an illustrative representation of a variant of fish sorting.

Sorting the fish preferably includes sorting for regulatory compliance. In a specific example, sorting for regulatory compliance can include: based on the fish species (e.g., as determined in S100), determining a set of relevant regulatory requirements that applies to the species, comparing one or more additional fish attributes (e.g., a size requirement) to the set of relevant regulatory requirements, comparing the one or more additional fish attributes against the set of relevant regulatory requirements, and keeping or discarding the fish based on the comparison (e.g., example shown in FIG. 8).

Sorting the fish can additionally or alternatively include sorting for compliance with any other processing requirements (e.g., a set of criteria). In examples, S150 can include comparing the set of fish attributes determined in S100 against a set of target attributes (e.g., processing requirements), and keeping or discarding the fish based on the comparison. Sorting the fish can include determining whether the fish attributes meet a threshold processing requirement (e.g., a percentage, a category, a rating, etc.). Comparing the fish attributes to the set of target attributes can be performed using value to value comparisons, comparing a weighted sum of one or more fish attributes to a target rating, modeling techniques, and/or any other suitable methods.

Figure 9:
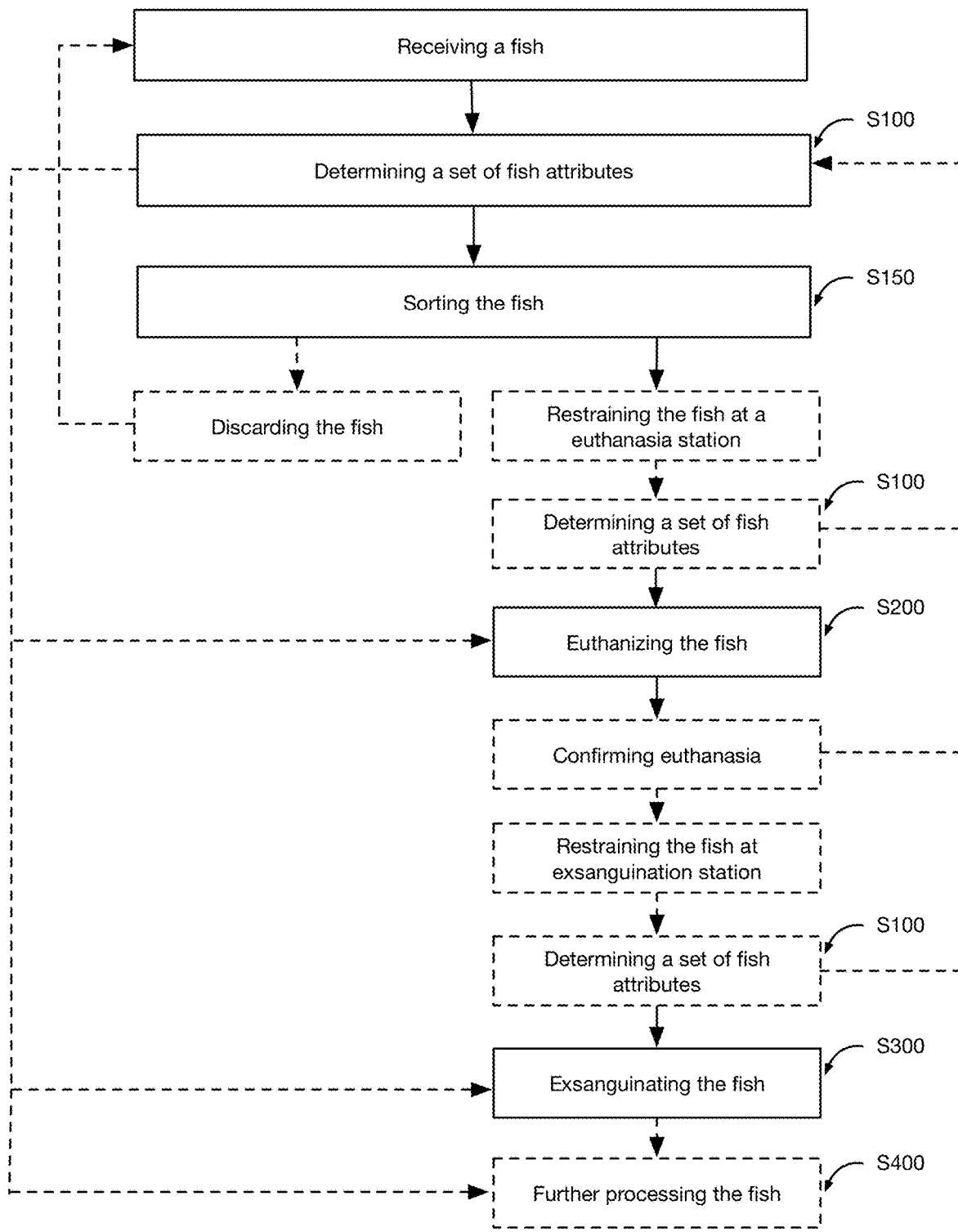
FIG. 9 is a schematic representation of a variant of the method.

If (e.g., only if) the fish meets the processing requirements, subsequent steps of the method can be performed (e.g., S200, S300, S400, etc.). However, if the fish does not meet the requirements, it can be discarded (e.g., expelled from the system, trigger a ceasing of further method processes, triggering a request for manual intervention, etc.). Discarding the fish can optionally include automatically releasing the fish from the fish processing device, for example by sending the fish back to the fish source (e.g., a body of water, a fish farm, etc.) or disposing of the fish (e.g., if the fish is dead, if the item received is not a fish, etc.). Additionally or alternatively, discarding the fish can include re-processing the fish (e.g., as shown in FIG. 9). In a first example, re-processing the fish can be performed if the fish meets certain processing requirements (e.g., regulatory requirements, quality requirements, etc.), but fails certain system processing requirements (e.g., if the fish is misaligned within the system) and/or safety requirements (e.g., if the fish is ingested with another non-fish item, if multiple fish are ingested, etc.). In a second example, re-processing the fish (e.g., transporting the fish back to an inlet of a processing device) can be performed if one or more measurements are inconclusive (e.g., due to an obscured lens, due to a high degree of noise within a measurement, etc.).

S150 can optionally include triggering a safety protocol (e.g., triggering an alarm, powering off the system, initiating a cleaning cycle, etc.) in the case that an unrecognized item, an unsafe item (e.g., a human body part, a non-fish item, etc.), a contaminated item (e.g., a diseased fish, a fish with parasites, etc., and/or any other unsuitable item is detected within the system. Triggering a safety protocol can optionally be performed alternatively to expelling the item from the system (e.g., in the case that automatically expelling the item could damage the item or the system), or in addition to expelling the item from the system.

However, sorting the fish can be otherwise performed.

4.3 Euthanizing the Fish S200.

Euthanizing the fish S200 can function to quickly, precisely, and/or otherwise optimally kill the fish. Preferably, S200 occurs after the fish is automatically sorted in S150. However, in alternative variants, S150 can be bypassed and S200 can be performed as the first step of the method (e.g., under the assumption that a fish received meets any processing requirements) and/or S200 can occur at any other suitable time. S200 can occur at the same station as fish sorting S150, exsanguination S300, further processing S400, and/or any other steps, but preferably S200 occurs at a distinct station configured for euthanasia. Euthanasia is preferably administered with a cut (e.g., cutting with a drill, cutting with a spike, cutting with a water jet, etc.), but can additionally or alternatively be administered with a blow (e.g., a percussive blow, a pneumatic blow, etc.) to the head region, beheading, partial beheading, electrical shocks, and/or any other suitable methods. S200 is preferably performed rapidly while fish is conscious (e.g., without previously stunning the fish), which can result in the most humane euthanasia process, but can alternatively include stunning the fish and subsequently euthanizing the fish.

The fish is preferably at least partially restrained prior to being euthanized, but can alternatively be unrestrained. The fish (e.g., the live fish) can optionally be imaged concurrently with being restrained by a restraint subsystem (e.g., a euthanasia restraint subsystem). The restraint subsystem preferably holds the fish upright (e.g., relative to the primary plane), but can additionally or alternatively hold the fish with its side against the primary plane, and/or in any other suitable configuration. The restraint subsystem preferably includes a material for restraining the fish that is flexible (e.g., and inelastic so as to not change dimensions, and elastic, compliant, non-compliant, etc.). However, the material can additionally or alternatively be: semiflexible, rigid, malleable, elastic, supple, ductile, and/or otherwise configured. The material is preferably transparent (e.g., referred to equivalently herein as translucent or clear), which can enable the imaging subsystem to sample imagery of the fish (e.g., the live fish) through the transparent material. However, the material can alternatively be semi-transparent, opaque, and/or otherwise configured, and optionally the imaging subsystem can still sample imagery of the fish through the material (e.g., using x-ray, etc.). The material (e.g., transparent material) can include any combination of: a plastic (acrylic, cellulose, cellulose acetate, nylon, silicone, PVC, polycarbonate, rubber, vinyl, etc., a glass, and/or any other suitable material. The material is preferably arranged in one, two, or more sheets that envelop the fish when a restraint subsystem closure mechanism is activated (e.g., examples shown in FIGS. 15A and 15B); however, the material can be otherwise arranged (e.g., in a set of claws, clamps, etc.). While the restraint subsystem is explained in the context of euthanasia, a similar restraint subsystem can be employed to restrain the fish at any other step of the method.

Alternatively, the restraint subsystem can be rigid, such as including a set of rigid and translucent (e.g., transparent, semi-transparent, etc.) panels that orient the fish into a particular configuration (e.g., upright, side-lying, etc.).

Euthanasia is preferably performed with a euthanasia tool (e.g., equivalently referred to herein as a kill tool) including any or all of: a drill, a pneumatic spike, a spike, a water jet, an air jet, a blade, an electrode set, a fishing priest, a fishing bat, and/or any other suitable tool.

Euthanizing the fish can include determining a set of euthanasia parameters (e.g., referred to equivalently herein as kill parameters) based on a set of measurements of the fish and/or based on the set of fish attributes (e.g., species, size, etc.). Determining euthanasia parameters can optionally include determining a location of one or more anatomical features (e.g., the brain) of the fish based on the set of measurements (e.g., using a fish component model). Alternatively, trained models can be used to analyze only the collected data and absent of explicitly determining a set of intermediate anatomical measurements or identifications. Preferably, the measurements include imagery, but can additionally or alternatively include any other measurement modalities. The measurement set can be the same and/or different from the measurement set used in S150. Preferably, the measurement set depicts at least a head region of the fish. Additionally or alternatively, the measurement set can depict the entire fish, and/or any other portion of the fish. In variants, the measurement set can include images depicting the side profile of the fish, a front view of the fish, a top view of the fish, a bottom-side view of the fish, and/or any other suitable perspective. Determining euthanasia parameters can be performed using a set of trajectory models, such as a euthanasia trajectory model, which can function to determine a euthanasia trajectory for one or more euthanasia tools and/or any other suitable euthanasia parameters.

Figure 12A:
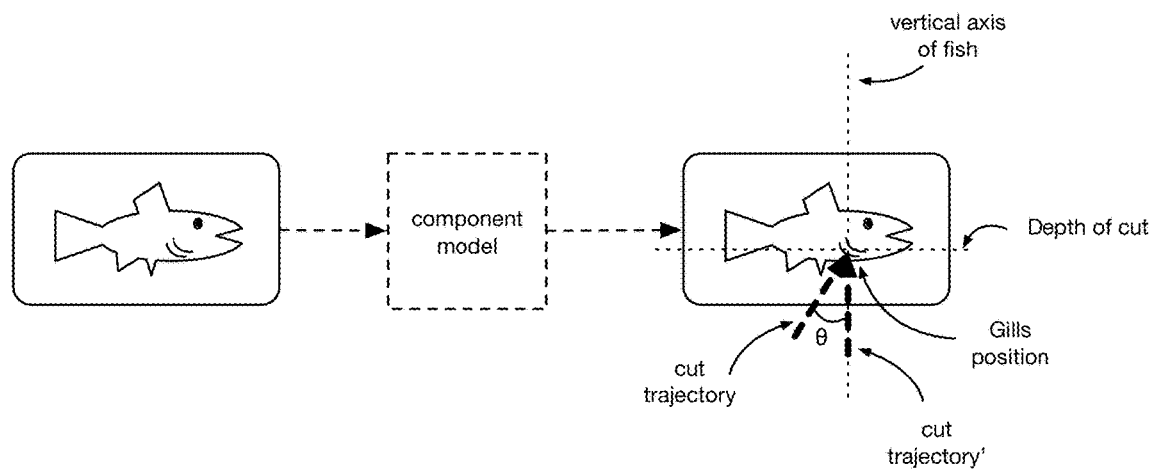
FIGS. 12A, 12B, and 12C are illustrative representations of variants of determining an exsanguination trajectory, a frontal perspective of the exsanguination trajectory relative to the fish, and a top-down view of the exsanguination trajectory relative to the fish, respectively.
Figure 12B:
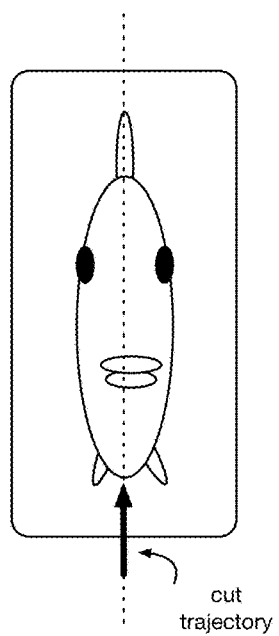
Figure 12C:
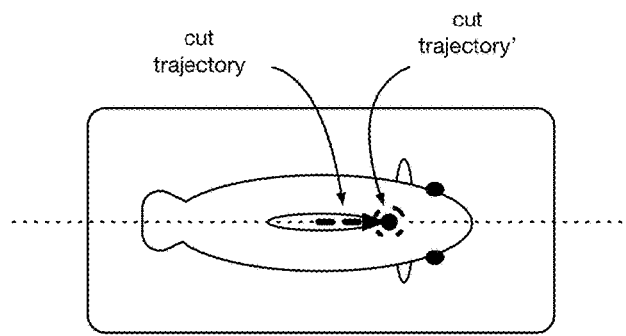

Determining the set of euthanasia parameters can include determining a euthanasia tool trajectory (e.g., referred to equivalently herein as a kill tool trajectory), including a euthanasia tool angle (e.g., relative to any suitable plane or planes, relative to axes as defined in any or all of FIGS. 12A-12C, etc.), euthanasia tool point of entry, and/or any other suitable parameters. Preferably, the euthanasia trajectory is perpendicular to the head of the fish at a point where the tool first makes contact with the head (e.g., the trajectory perpendicular to the fish head and/or profile), as the inventors have discovered that the euthanasia tool faces less slipping and resistance when puncturing the fish head and brain with an approximately orthogonal (e.g., perpendicular) entry (e.g., entry at a substantially 90-degree angle in one or more planes) relative to a surface defined by the fish (e.g., top of fish's head). Additionally or alternatively, the tool trajectory can follow a non-perpendicular angle relative to the head of the fish. A non-perpendicular angle can be beneficial, for instance, when the shortest path from the exterior of the fish head (e.g., along the sagittal plane) to the brain is not perpendicular, when a perpendicular path intersects hard tissues (e.g., skull, bone, etc.), when a non-perpendicular angle would be optimal to hit the brain and/or spinal cord of the fish based on the shape of the brain and/or the location of the spinal cord relative to the brain, and/or under other suitable circumstances (e.g., to minimize re-adjustments of the tool between different fish and/or different fish species). In variants, the tool entry angle (e.g., relative to an axis defined by the intersection of the transverse plane and sagittal plane) can: be 90 degrees, less than 90 degrees (e.g., <85 degrees, <80 degrees, <75 degrees, <70 degrees, <65 degrees, <60 degrees, etc.), be greater than 90 degrees (e.g., >95 degrees, >100 degrees, >105 degrees, >110 degrees, >120 degrees, >125 degrees, etc.), fall within a specified range (e.g., 85-95 degrees, 80-100 degrees, 75-105 degrees, 70-110 degrees, etc.), and/or be otherwise defined.

Figure 5:
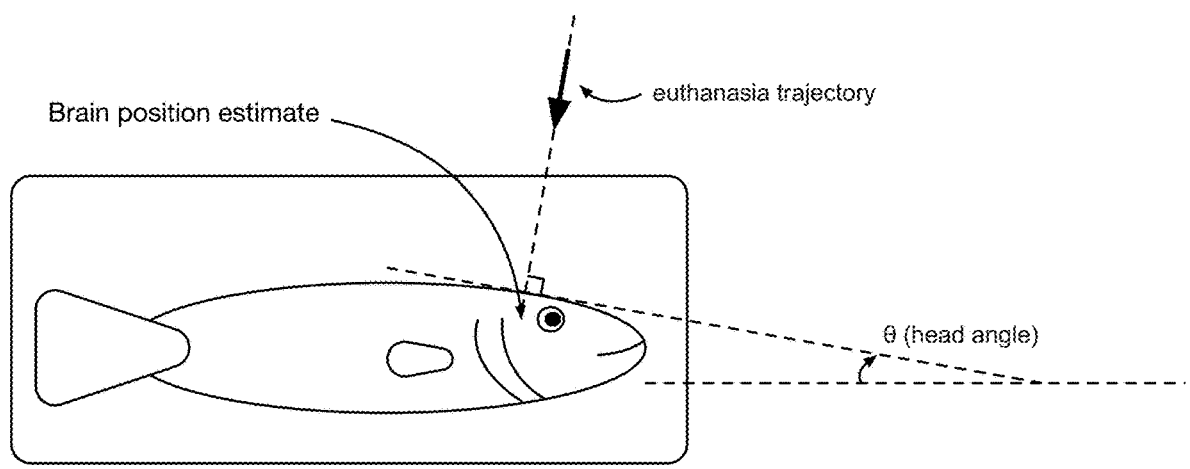
FIGS. 5-7 are illustrative representations of variants of determining a euthanasia trajectory.

Preferably the trajectory intersects the brain location (e.g., example shown in FIG. 5), but can alternatively not intersect the brain location (e.g., if the euthanasia method is beheading, etc.). In examples, the trajectory intersects the forehead of the fish along the sagittal plane, but can additionally or alternatively intersect a side of the fish's head, and/or otherwise intersect the fish. The trajectory can be determined using: a fish measurement (e.g., image), the brain location, and/or other inputs. The trajectory can be determined using a euthanasia trajectory model (e.g., classical ML model, scoring model, etc.), and/or any other model.

Determining the set of euthanasia parameters can additionally or alternatively include determining euthanasia tool/kill tool parameters (e.g., tool type, speed, force, etc.) that accompany the trajectory. In examples, tool parameters can be: determined using a model (e.g., the euthanasia trajectory model, a planning module, etc.); determined based on the measurement set; predetermined (e.g., and retrieved) based on the fish species, size, and/or any other attribute; and/or otherwise determined.

Preferably, the euthanasia trajectory model determines the trajectory directly based on measurements of the fish (e.g., a set of images including a head region of the fish). In examples, given a set of images of the fish (e.g., the restrained fish), the euthanasia trajectory model can output one or more of the euthanasia parameters of the set of euthanasia parameters.

Additionally or alternatively, the euthanasia trajectory model can determine the trajectory based on a set of one or more outputs of the component model (e.g., brain location, striping patterns, etc.). In a specific example, the fish component model can optionally include a fish component model that can determine (e.g., measure, predict, etc.) the location of the fish brain and/or brain cavity (e.g., a brain location model). Optionally, an output of a component model can be used to enforce a trajectory constraint. In an example, when the euthanasia trajectory includes a path perpendicular or substantially perpendicular (e.g., within an angle range surrounding 90-degrees) to the slope of the head of the fish that intersects with the brain location, the method can include determining a profile of the fish head (e.g., a mask of the fish head, a projection of the fish head, etc.), optionally determine a set of surface normals for each of a set of points on the profile, select a point with a surface normal aligned with the brain location, and optionally determine a line or vector connecting the point with the brain location.

In a first variant, classical methods are used to determine the trajectory. In examples, one or more candidate tool entry points and/or tool entry angles (e.g., each of which satisfies a set of criteria) along a head profile of the fish (e.g., as detected within an image) can be proposed by the euthanasia trajectory model. If multiple candidates are proposed by the model, an optimal point and/or angle can be selected (e.g., based on maximizing a set of criteria). In a specific example, surface normals are determined at each member of a set of head points (e.g., proximal the kill tool position), and a head point with surface normal substantially aligned with brain location is selected. The surface normals can be determined from: a profile of the head, a projection of the head, a depth measurement, and/or any other measurement.

Figure 6:
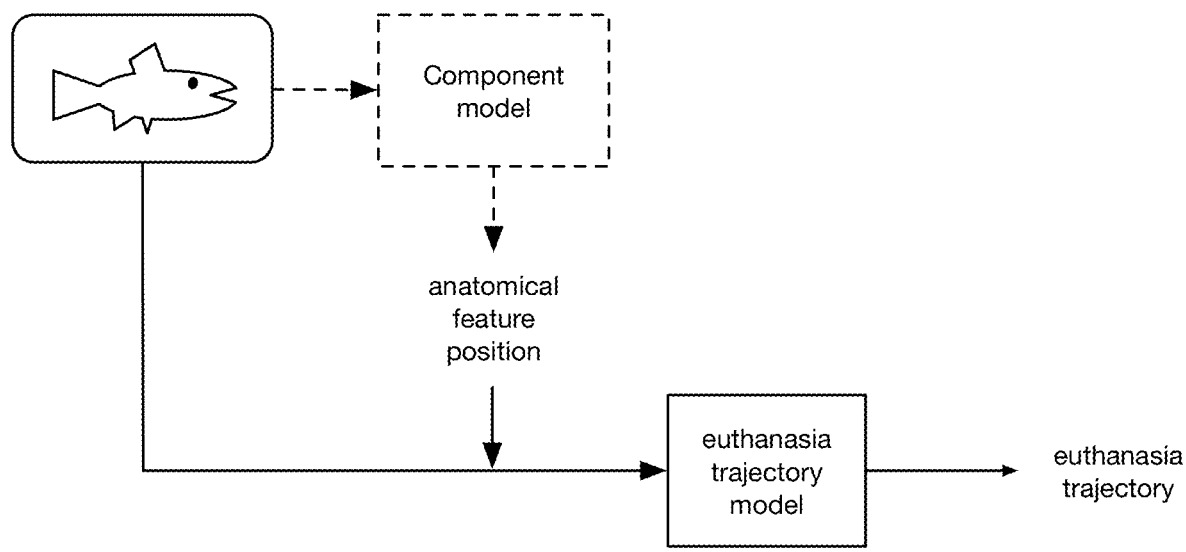
Figure 7:
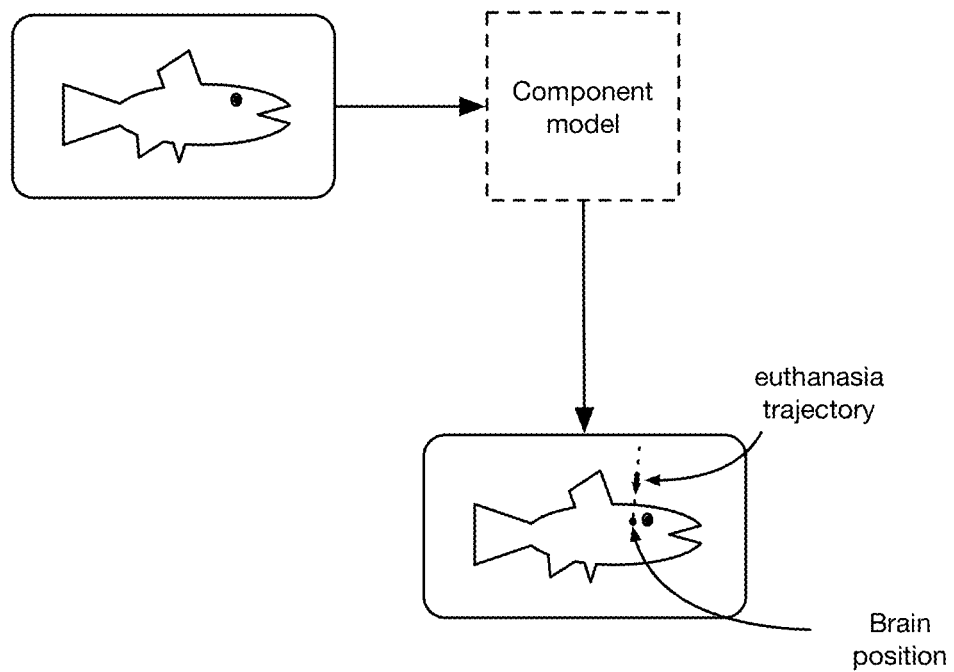

In a second variant, a component model is additionally used to determine the trajectory. The component model can be a separate model from the euthanasia trajectory model, and/or a component of the euthanasia trajectory model (e.g., an intermediate layer of a multi-layer neural network). In a first example, the same trajectory model includes a component model, and is trained to determine both the location of an anatomical feature (e.g., brain location) and the trajectory (e.g., example shown in FIG. 7). In a second example, a first model (e.g., the component model) is used for determining the location of an anatomical feature (e.g., brain location), and a second model (e.g., euthanasia trajectory model) determines the trajectory based on the location of the anatomical feature (e.g., example shown in FIG. 6).

However, the euthanasia trajectory model can be otherwise determined.

After determining kill parameters, the kill parameters (e.g., tool control commands) are preferably executed to euthanize the fish by a robotic fish processing system.

S200 can optionally include confirming euthanasia, which can function to determine that the fish is not alive when S300 is performed. Preferably the standard for confirming euthanasia is confirming brain death, but can alternatively be any other humane standard. Confirming euthanasia can be performed by: detecting a lack of fish movement (e.g., in a video of the fish, based on other sensor readings, etc.), detecting splayed fins indicative of death in an image of the fish, determining whether the fish moves in response to a stimulus (e.g., applied force, electrical stimuli), using a sensor (e.g., EKG, ECG, electrode, force sensor, accelerometer, etc.), and/or otherwise determined. As for any other step of the method, the methods used for confirming euthanasia can be species specific, or generic across one or more species. Euthanasia can be confirmed using a confirmation model (e.g., a neural network, a motion detection model, etc.) and/or any other suitable model.

However euthanizing the fish can be otherwise performed.

4.4 Exsanguinating the Fish S300.

Exsanguinating the fish S300 can function to remove blood from the body of the fish after euthanizing the fish S200. Preferably S300 occurs within the same fish processing device as S200, but can alternatively occur within a separate fish processing device (e.g., wherein the fish can optionally be automatically transferred between fish processing devices by conveyor, chute, etc.; within the same location(s) such as within the same fixturing mechanism, etc.). When S300 and S200 are performed within the same fish processing device, S300 is preferably performed at a separate workstation within the fish processing device as S200, but can alternatively occur at the same workstation (e.g., wherein fixturing is modified between S200 and S300, wherein fixturing is not modified between S200 and S300, etc.). S300 preferably includes determining exsanguination instructions (e.g., an exsanguination trajectory). S300 can optionally include locating anatomical features (e.g., gills, tail, belly, etc.), and determining exsanguination instructions based on the anatomical features. Preferably, the fish is exsanguinated by one or more cuts which pierce major arteries (e.g., a cut proximal to the gills and a cut proximal to the tail). A single cut can confer the benefit of reducing system complexity, while two or more cuts can confer the benefit of increasing exsanguination speed, and therefore system throughput. Tools for exsanguination can include: a blade, a rotating blade, a spike, a water jet cutter, an air jet cutter, a hot wire, and/or any other suitable tool. However, additional or alternative exsanguination methods can be employed.

S300 is preferably performed separately (e.g., in series, with different tool(s), with different tool parameters such as angle(s) and/or locations, etc.) relative to S200. Alternatively, S300 can be performed as part of S200, in parallel or partially overlapping with S200, and/or at any other time(s).

Figure 15A:
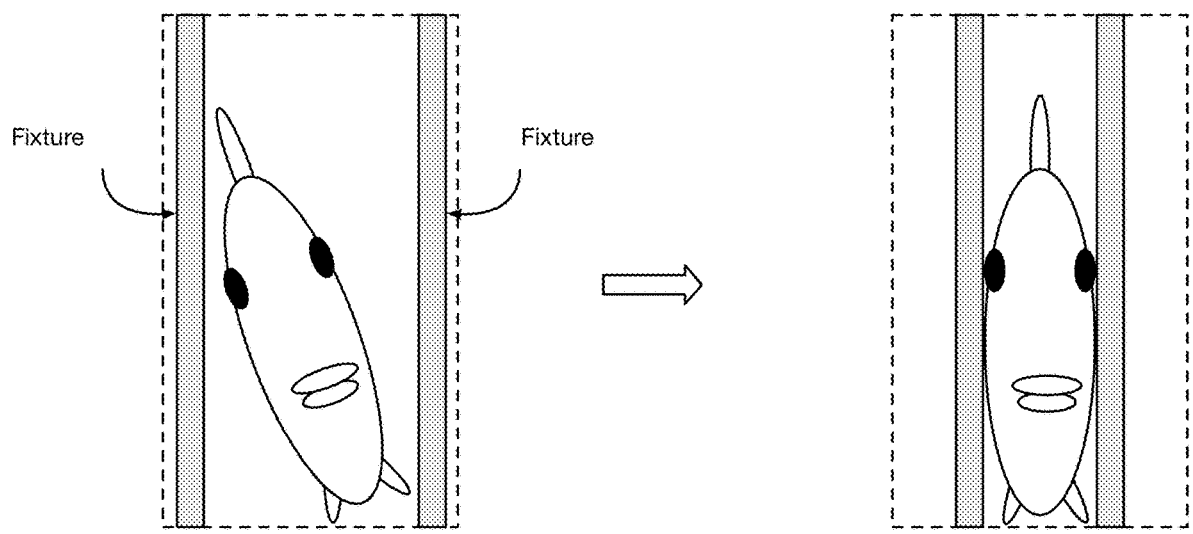
FIGS. 15A and 15B are illustrative representations of variants of a restraint subsystem.
Figure 15B:
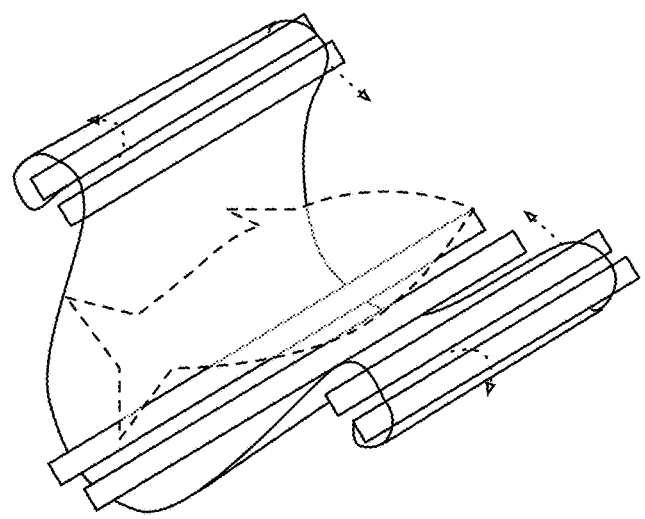

In variants, the fish is at least partially restrained within the workstation (e.g., by a fixturing system, referred to equivalently herein as a restraint subsystem) to ensure it remains still and/or otherwise particularly oriented (e.g., upright, non-tilted, etc.) during cutting. The fish can be positioned relative to (e.g., restrained against) a primary plane of the workstation (e.g., from which and/or towards which the cutting tool can actuate). Optionally, the fish is positioned within the workstation (e.g., in a corner, against a stopper/bumper, etc.) prior to being restrained, while being restrained (e.g., as shown in FIG. 15A), and/or at any other suitable time. The fish can be positioned to rest on its side relative to a base of the workstation (e.g., wherein the base defines the primary plane), upright relative to the base of the workstation, and/or otherwise positioned. However the fish is positioned relative to the workstation, the exsanguination tool can intersect (e.g., at a perpendicular angle and/or at any other angle a plane offset from (e.g., by $>=0$ m) the longitudinal plane of the fish, the sagittal plane, the transverse plane, and/or any other plane.

Preferably, exsanguination is performed by a tool (e.g., referred to equivalently herein as 'cut tool' and 'cutting tool') that is constrained to an operational space. In examples, the cutting tool can have up to six degrees of freedom relative to the primary plane (e.g., one or two DOF along the plane; one, two, or three angular DOF relative to the plane; and/or one DOF against the plane), but can alternatively have more than six DOF. The exsanguination trajectory can be perpendicular to the fish (e.g., relative to its underbelly as shown in FIGS. 12B and 12C, relative to a side of its body, etc.), angled relative to the fish (e.g., as shown in FIG. 12A, angled relative to a plane of symmetry of the fish, having a nonzero angle relative to the axis shown in FIG. 12B, having a nonzero angle relative to the axis shown in FIG. 12C, etc.), a combination of angled and perpendicular (e.g., depending on which planes and/or axes are being considered), and/or otherwise oriented. The tool preferably actuates along a single axis, but can additionally or alternatively actuate along multiple dimensions (e.g., wherein the tool moves along and/or rotates about one or more of its non-axial degrees of freedom during actuation, wherein the tool changes direction mid-cut, wherein the tool makes a sweeping cut in 2 or 3 dimensions, etc.) and/or otherwise be constrained. The trajectory can be determined based on: the parameters (e.g., position, area, etc.) of one or more anatomical features, a fish measurement (e.g., image), and/or any other suitable information. The trajectory can be determined using an exsanguination trajectory model (e.g., path planner, rule set, etc.) and/or any other suitable model such that the cutting tool intersects a target anatomical feature (e.g., gills, tail, artery, heart, etc.) along its trajectory. The target anatomical feature (e.g., artery) can be detected by the component model, or can be implicitly intersected by the trajectory without consideration of the location of the anatomical feature (e.g., by a trained trajectory model that outputs an ideal trajectory based on sampled measurements).

The exsanguination trajectory models function to determine an exsanguination trajectory (e.g., including an exsanguination tool angle, an exsanguination tool point of entry, etc.) for one or more exsanguination tools. Optionally, one model can determine the exsanguination trajectory, without an intermediate component model. Optionally, the exsanguination trajectory models can be separate from the component models, and determine the trajectory based on the parameters associated with an anatomical feature (e.g., location, extent, etc.) output by the component model, and an image or other measurement of the fish (e.g., using classical methods, neural networks, etc.). Optionally, the component model (and/or trajectory model) can determine the position of an anatomical feature defining a stopping point, and the exsanguination trajectory model can determine a cut trajectory that terminates before and/or at the stopping point. The stopping point can be: the extent of the anatomical feature (e.g., the length of the gills), a secondary anatomical feature (e.g., the spine), and/or any other anatomical feature. In a specific example, the exsanguination trajectory extends from the tool incision point of the fish (e.g., the bottom of the fish) towards the spine, and terminates before reaching the spine. However, the exsanguination trajectory model can be otherwise configured.

Figure 13:
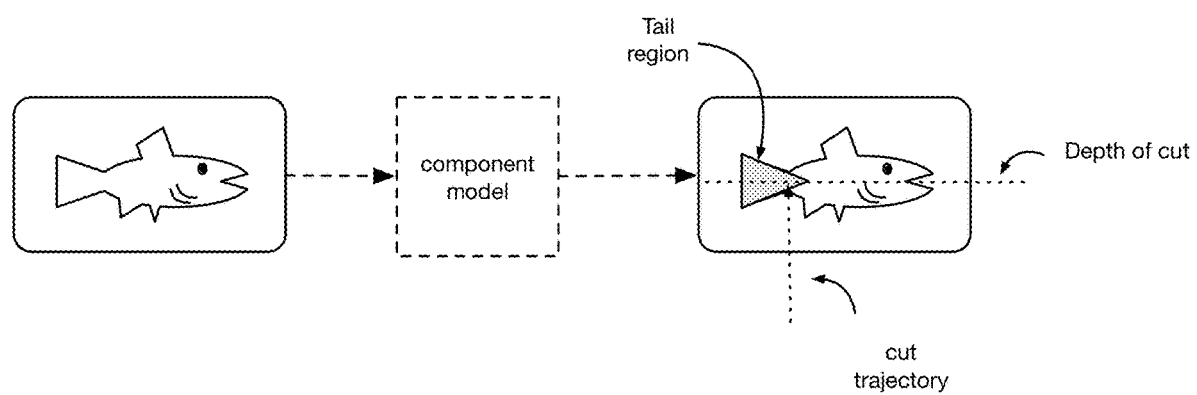
FIG. 13 is an illustrative representation of a variant of determining an exsanguination trajectory.

In variants, the exsanguination trajectory can be configured such that the cut(s) targets a point at or proximal to any or all of: the gills, the gill plates, the heart, the tail, the base of the head, under the jaw, the fins (e.g., the pectoral fins, the base of the dorsal fin, etc.), and/or any other suitable area (e.g., any region with a large quantity and/or size of blood vessels). Preferably, the exsanguination trajectories are determined with one or more trained models (e.g., a species-specific trajectory model and/or size-specific trajectory model) based on measurement data. Component models can optionally be used to locate anatomical features (e.g., gills, tail, arteries, etc.) based on the measurements (e.g., examples shown in FIGS. 12 and 13), which can be sampled of the fish prior to exsanguination to locate anatomical features using any of the variants described in S200. Component models can optionally include models specific to an anatomical feature (e.g., gill/brain/tail/eye detector, etc.), and/or function to label a plurality of anatomical features. However, in preferred variants intermediate component detection is not required.

In a first variant, exsanguinating the fish includes a first cut (equivalently referred to herein as a cranial and/or anterior cut, which in examples can indicate a closer proximity to the fish's head than the fish's tail). The cranial cut can include cutting the fish proximal to its gills (e.g., through the gills, between the gills and the heart, behind the gill plates, etc.) and/or its heart. The cut is preferably positioned between the gills and the heart (e.g., to hit an artery and/or increase a rate of blood egress), but can be otherwise positioned (e.g., through the gills, through the heart, etc.). Exemplary cuts can include: a cut along a line directed into (e.g., perpendicularly, at any other angle, etc.) the longitudinal plane of the fish (e.g., wherein the line originates from the underbelly of the fish), the transversal plane (e.g., wherein the line originates from the rear of the fish), the sagittal plane (e.g., wherein the line originates from the left and/or the right side of the fish), and/or any otherwise oriented cut. Preferably, the cut left by the cutting tool is substantially parallel to the sagittal plane, and extends from the fish underbelly towards the front of the fish (e.g., so as to bypass a greater portion of harvestable meat). In a first example, the gills are lifted away from the belly and the cut is positioned underneath the lifted gills. In second example, the cut trajectory intersects a target region (e.g., gill region) starting at the underbelly of the fish, extends from the bottom to the top of the fish, and ends at a specified cut depth (e.g., a predetermined distance before the upper boundary of the fish, a predetermined distance from a detected spine region of the fish, a predetermined cut distance, etc.). In a third example, the tool path can intersect a target region (e.g., the gill region) from multiple directions, depending on what side of its body the fish is positioned on. Optionally, the component model can be used to determine what side of its body the fish is positioned on. In a fourth example, the cut is perpendicular to the long axis of the fish body and to the underbelly of the fish, but can alternatively be otherwise angled.

In a second variant, exsanguinating the fish includes a second cut (equivalently referred to herein as a caudal and/or posterior cut, which in examples can indicate a closer proximity to the fish's tail than the fish's head). The caudal cut can include cutting through and/or proximal to (e.g., as close as possible without directly cutting) the tail (e.g., example shown in FIG. 13), and/or at any other suitable point(s). The cut can move straight down relative to the restrained position of the fish, sideways relative to the fish, or along any other suitable path. Relative to the fish, the cut can extend: from the bottom of the fish upwards, from the top of the fish downwards, into the side of the fish, and/or be otherwise oriented. A component model (e.g., tail detector) can optionally be used to locate the tail (e.g., tail centroid, a region encompassing the tail, etc.) and further optionally the tail orientation and/or thickness. Based on the detected tail location, an exsanguination trajectory model can be used to determine a cut tool path (e.g., perpendicular to the spine). In a first example, the tail is cut with a maximum depth of cut that both severs the dorsal aorta (e.g., determined based on the tail thickness) and leaves the tail partially attached. In a second example, the tail is fully cut off. Alternatively, a trajectory for this cut can be determined without locating the tail, without locating other anatomical regions, and/or otherwise determined.

The first and second cuts can both be performed on one or more fish, a single cut can be performed on one or more fish, other cuts (e.g., more than 2, different cuts, etc.) can be performed on one or more fish, the number of cuts performed can depend on one or more fish attributes and/or results of a first cut, and/or any other cuts can be performed. The cranial cut is preferably located anterior to the caudal cut, but in alternative examples, the caudal cut can be located anterior to the cranial cut. Further alternatively, multiple cuts can be located at the same location along a length of the fish, but at different heights (e.g., dorsal vs. ventral) and/or depths/widths (e.g., right lateral vs. left lateral).

In a third variant, exsanguinating the fish includes making multiple cuts (e.g., a first and second cut; a first and second vessel cut; a first, second, and third cut; etc.). In a specific example, the multiple cuts can include locations through and/or proximal to the gills and the tail. Additionally or alternatively, any other locations can be cut through and/or proximal to. Any of the methods described in the first two variants can be used.

In a fourth variant, exsanguinating the fish includes cutting its belly along the long axis of the fish body (e.g., for the full extent of the belly, for a subset of the length of the belly, etc.).

Optionally, exsanguinating the fish further includes assisted bleeding. After cutting, blood flow is sped up by passing a pressurized fluid (e.g., water, saline solution, compressed air, etc.) through the blood vessels of the fish. Assisted bleeding can be sensor-aided (e.g., to identify a target insertion point for pressurized fluid application).

Optionally, exsanguinating (and/or euthanizing, further processing, etc.) the fish includes determining a trajectory that maximizes and/or otherwise preserves a quantity of harvestable meat (e.g., viable meat, edible meat, flesh, etc.) remaining after exsanguination. The component model can output a location (e.g., region defining) of the harvestable meat within the fish. The trajectory model can determine (e.g., using optimization methods), based on the output of the component model, a tool path to a target anatomical feature (e.g., an artery, a blood vessel, the heart, etc.) that bypasses the harvestable meat (e.g., by way of the gills, etc.). Optionally, the system can employ techniques used to achieve medical precision (e.g., in robotic surgeries, in minimally invasive surgical procedures, etc.) to ensure minimal damage to the harvestable meat. Constraints for maximizing harvestable meat output can include the number and/or orientation of degrees of freedom of the tool (e.g., the exsanguination cutting tool). To achieve trajectories that can bypass harvestable meat, the system (e.g., at the exsanguination station) may include a cutting tool with multiple degrees of freedom (DOF) (e.g., with one or more DOF along the workstation primary plane and/or one or more angular DOF). Optionally, more complex trajectories (e.g., more closely optimized to maximize harvestable meat) can be achieved by moving the cutting tool along one or more of its degrees of freedom during the actuation of the tool. In the example pictured in FIG. 12A, for example, the angle theta can vary from 0 degrees (as shown) to any other suitable value, and can be optimized to optimize a harvestable meat parameter. However exsanguinating the fish can be otherwise performed.

4.5 Further Processing the Fish S400.

The method can optionally include further processing the fish S400. Further processing can include any of the techniques described herein to detect key anatomical features, determine processing tool instructions and execute the instructions. Further processing can include: filleting, skinning, scaling, cutting, removing fins, removing spikes, packaging, and/or any other processes.

Optionally S400 can include repeating S100 and S150 for the fish, and determining what subsequent further processing to perform.

In a first set of examples, after skinning, scaling, cutting, or filleting the fish, processing of subsequent imagery of the fish by one or more models (e.g., those described herein) can reveal potential quality metrics (e.g., defects such as parasites, blood clots, etc.) that will result in rejecting the fish from further processing.

In a second set of examples, after euthanasia and exsanguination, processing of subsequent imagery of the fish by one or more models (e.g., those described herein) can reveal that at least one of the euthanasia step or the exsanguination step yielded handling errors (e.g., excessively mangled the fish). Handling errors can optionally result in suggesting the fish be further manually processed (e.g., filleted) rather than automatically processed.

However, further processing the fish can be otherwise performed.

4.6 Tracking the Fish S500.

The method can optionally include tracking the fish S500, which can function to track data for an individual fish and/or a set of fish. The data can include: sensor measurements collected at any point in the method, fish attributes such as those determined in S150, the locations of key anatomical features (e.g., brain, gills, tail, etc.) as determined in S200-S400, the trajectories and/or other tool parameters as determined in S200-S400, differences (e.g., weight pre and post processing) between each stage of the method and/or between processing beginning and end, fish source (e.g., farm ID, boat ID, pond ID, etc.), fish cultivation information (e.g., caught location, feed type, feed frequency, farm pond density, disease history, etc.), and/or any other information.

S500 can include determining an identifier for each fish and associating the data collected for the fish with the identifier. The identifier can be determined from a measurement of the fish (e.g., feature vector of anatomical features remaining post-processing or untouched during processing), be a tag (e.g., visual identifier, NFC tag, etc.) attached to the fish, be the identifier for a container retaining the processed fish, and/or any other identifier.

Figure 3:
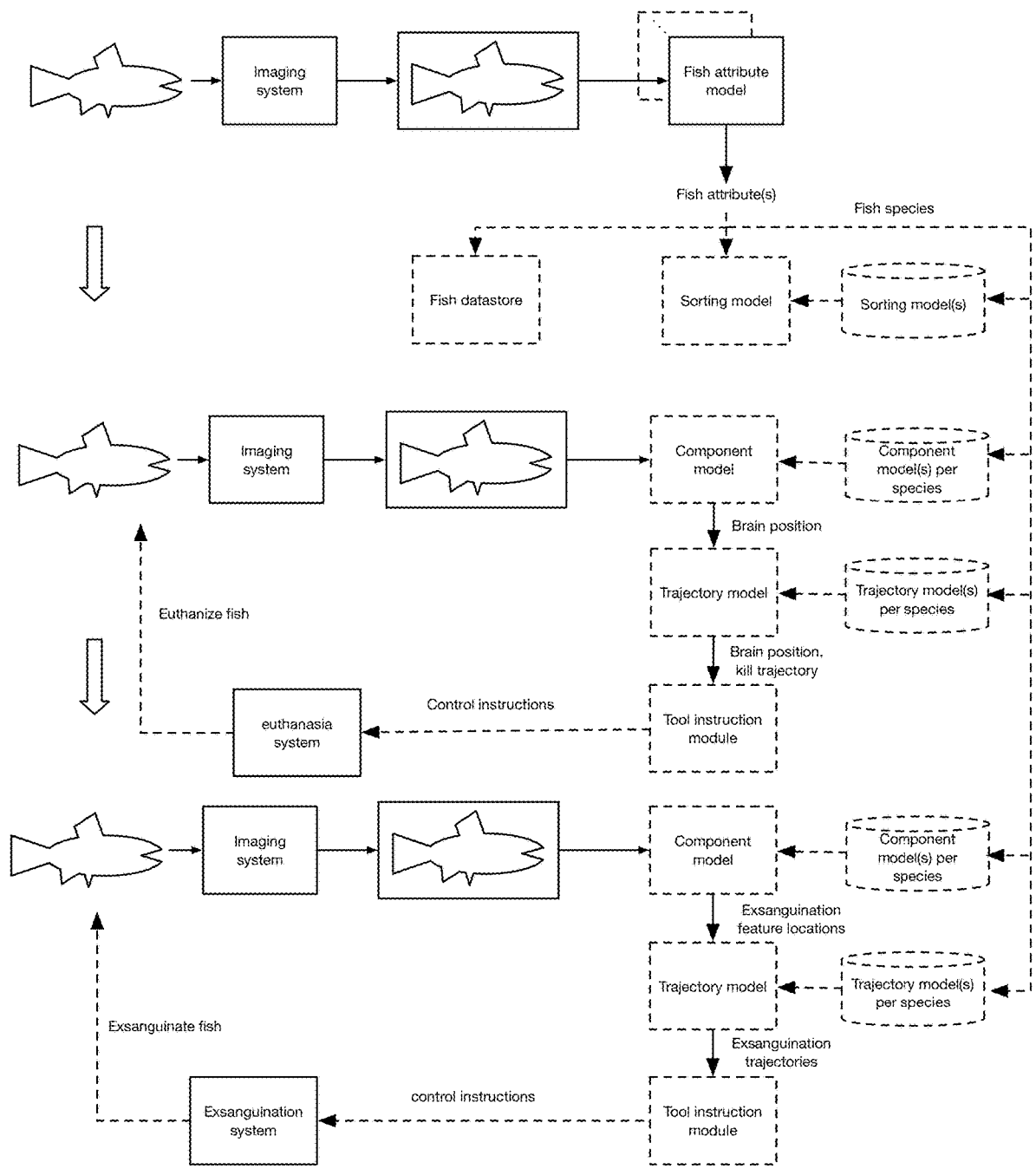
FIG. 3 is a schematic representation of a variant of the system.

Optionally, tracking the fish can include sending any of the data collected about the fish to a datastore (e.g., a local data storage system, a cloud storage system, a database, example shown in FIG. 3, etc.), sending any of the data collected to an ERP system or platform, printing or otherwise rendering the data, and/or otherwise storing the data.

Additionally or alternatively, tracking the fish can include determining environmental information (e.g., information about the maritime environment, performing maritime domain awareness, etc.) pertaining to the conditions in which the system is being used. For example, environmental information can include a location in which the system is being used; a date, season, or time in which the method is performed; regulatory requirements; and/or any other suitable information. Environmental information associated with the tracked fish can optionally be recorded and stored (e.g., in association with the fish, with the fish batch, etc.).

In examples location information can be determined using GPS, INS, RF, ECS, ECDIS, radar, AIS, GNSS, Depth Sounders and echo sounders, compass systems, lidar and sonar systems, satellite communication systems, through a data connection to a vessel and/or factory in which the system is installed, and/or any other suitable localization technologies. In examples, location information can be used to retrieve processing requirements (e.g., regulatory requirements) to inform sorting the fish S150, and/or any other relevant information to inform any other steps of the method.

However, tracking the fish can be otherwise performed.

Alternative embodiments implement the above methods and/or processing modules in non-transitory computer-readable media, storing computer-readable instructions that, when executed by a processing system, cause the processing system to perform the method(s) discussed herein. The instructions can be executed by computer-executable components integrated with the computer-readable medium and/or processing system. The computer-readable medium may include any suitable computer readable media such as RAMs, ROMs, flash memory, EEPROMs, optical devices (CD or DVD), hard drives, floppy drives, non-transitory computer readable media, or any suitable device. The computer-executable component can include a computing system and/or processing system (e.g., including one or more collocated or distributed, remote or local processors) connected to the non-transitory computer-readable medium, such as CPUs, GPUS, TPUS, microprocessors, or ASICs, but the instructions can alternatively or additionally be executed by any suitable dedicated hardware device.

Embodiments of the system and/or method can include every combination and permutation of the various system components, the various method processes, and/or variants or examples thereof, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the embodiments of the invention without departing from the scope of this invention defined in the following claims.

We claim:

1. A fish exsanguination system, comprising:
a set of fish restraints defining a working volume;
a sensor system facing the working volume;
an exsanguination mechanism comprising an actuation mechanism and an exsanguination tool actuatably coupled to the working volume; and a processing system configured to:
receive a set of measurements of a live fish, restrained by the set of fish restraints, from the sensor system;
automatically determine an exsanguination trajectory based on the set of measurements, using a trained trajectory determination model; and
control the exsanguination mechanism to actuate the exsanguination tool along the exsanguination trajectory.

2. The fish exsanguination system of claim 1, further comprising a fish euthanasia mechanism comprising an actuatable tool coupled to the working volume, wherein the processing system is further configured to:
identify a critical anatomical feature of the fish; and
actuate the actuatable tool to euthanize the fish by entering the critical anatomical feature while the fish is restrained within the set of restraints.

3. The fish exsanguination system of claim 1, wherein:
the exsanguination mechanism further comprises a secondary exsanguination tool; and
the processing system is further configured to automatically determine a second exsanguination trajectory based on the set of measurements and control actuation of the secondary exsanguination tool along the second exsanguination trajectory.

4. The fish exsanguination system of claim 1, wherein the trajectory determination model determines the exsanguination trajectory by optimizing a harvestable meat parameter.

5. The fish exsanguination system of claim 1, wherein the exsanguination trajectory intersects only a portion of a tail of the fish.

6. The fish exsanguination system of claim 1, wherein the processing system is further configured to:
determine a species of the fish; and
select the trained trajectory determination model from a set of candidate trained trajectory determination models based on the species.

7. The fish exsanguination system of claim 1, wherein the exsanguination trajectory extends along a sagittal plane of the fish.

8. The fish exsanguination system of claim 1, wherein the fish exsanguination system is onboard a floating vessel.

9. The fish exsanguination system of claim 1, wherein the processing system is further configured to estimate a location of an internal anatomical feature of the fish based on external features extracted from the set of measurements, wherein the exsanguination trajectory intersects the internal anatomical feature of the fish.

10. A method, comprising:
restraining a live fish;
collecting a set of images of the restrained fish using a set of sensors;
based on the set of images, automatically determining an exsanguination trajectory using a trajectory model, wherein the exsanguination trajectory comprises a dynamically determined exsanguination angle; and
exsanguinating the fish by actuating an exsanguination tool based on the exsanguination trajectory.

11. The method of claim 10, further comprising:
automatically determining an attribute of the fish based on the set of images; and
selecting the trajectory model based on the attribute.

12. The method of claim 11, wherein the attribute comprises a fish species classification.

13. The method of claim 10, wherein the exsanguination trajectory is at an angle relative to a coronal plane of the fish.

14. The method of claim 10, further comprising determining a bulk attribute of the fish based on the set of images, wherein exsanguination is performed when the bulk attribute meets a predetermined condition and rejecting the fish when the bulk attribute fails the predetermined condition.

15. The method of claim 14, wherein the predetermined condition is selected based on a fish species classification of the fish performed based on the set of images.

16. The method of claim 10, further comprising:
extracting a set of observed fish features from the set of images; and
determining a location of a hidden fish feature based on the set of visible fish features, wherein the trajectory model determines the exsanguination trajectory based on the location of the hidden fish feature.

17. The method of claim 10, further comprising euthanizing the restrained fish contemporaneously with exsanguinating the fish.

18. The method of claim 17, further comprising electrically verifying euthanasia of the restrained fish.

19. The method of claim 10, wherein determining the exsanguination trajectory comprises:
detecting a tool entry region of the fish based on the set of images;
determining a surface topology of the tool entry region; and
determining the exsanguination trajectory based on the surface topology.

20. The method of claim 10, wherein the fish is alive when the set of images are collected.

* * * * *